US008557388B2

(12) United States Patent
Hong

(10) Patent No.: US 8,557,388 B2
(45) Date of Patent: Oct. 15, 2013

(54) EROSION RESISTANT COATINGS FOR LEADING EDGES OF AIRFOILS

(75) Inventor: Shek C. Hong, Glastonbury, CT (US)

(73) Assignee: Hontek Corporation, South Windsor, CT (US)

( * ) Notice: Subject to any disclaimer, the term of this patent is extended or adjusted under 35 U.S.C. 154(b) by 0 days.

(21) Appl. No.: 12/815,963

(22) Filed: Jun. 15, 2010

(65) Prior Publication Data

US 2010/0256296 A1    Oct. 7, 2010

Related U.S. Application Data

(63) Continuation of application No. 11/136,827, filed on May 24, 2005, now Pat. No. 7,736,745.

(60) Provisional application No. 60/573,819, filed on May 24, 2004, provisional application No. 60/649,443, filed on Feb. 2, 2005.

(51) Int. Cl.
| B32B 27/00 | (2006.01) |
| B32B 27/40 | (2006.01) |
| C08G 18/08 | (2006.01) |
| C08L 75/00 | (2006.01) |
| C08K 3/20 | (2006.01) |
| C08K 5/34 | (2006.01) |
| C08K 5/3477 | (2006.01) |
| C07C 261/00 | (2006.01) |
| C07C 269/00 | (2006.01) |
| C07C 271/00 | (2006.01) |

(52) U.S. Cl.
USPC ........ 428/423.1; 524/589; 524/591; 524/101; 560/25; 560/26; 560/115; 560/158

(58) Field of Classification Search
USPC .......... 428/423.1; 524/589, 591, 101; 560/25, 560/26, 115, 158
See application file for complete search history.

(56) References Cited

U.S. PATENT DOCUMENTS

| 3,001,973 A | 9/1961 | Piepenbrink et al. |
| 3,124,605 A | 3/1964 | Wagner et al. |
| 3,144,349 A | 8/1964 | Swingler et al. |
| 3,152,162 A | 10/1964 | Fischer et al. |
| 3,201,372 A | 8/1965 | Wagner et al. |
| 3,341,878 A | 9/1967 | Hubbard |
| 3,394,164 A | 7/1968 | McClellan et al. |
| 3,513,491 A | 5/1970 | Gordon |
| 3,527,729 A * | 9/1970 | Olson et al. ............... 523/220 |
| 3,644,457 A | 2/1972 | Konig et al. |
| 3,654,370 A * | 4/1972 | Yeakey et al. ............. 564/480 |
| 3,738,947 A | 6/1973 | Fishbein et al. |
| 3,748,292 A | 7/1973 | Stander |
| 3,769,318 A | 10/1973 | Windemuth et al. |
| 3,832,311 A | 8/1974 | Windemuth et al. |
| 4,088,665 A | 5/1978 | Findeisen et al. |
| 4,097,951 A | 7/1978 | Hurtt |
| 4,101,497 A | 7/1978 | Charves et al. |
| 4,110,317 A | 8/1978 | Moravek |
| 4,155,896 A | 5/1979 | Rennier et al. |
| 4,294,719 A | 10/1981 | Wagner et al. |
| 4,344,855 A | 8/1982 | Schafer et al. |
| 4,465,562 A | 8/1984 | Kadooda |
| 4,580,944 A | 4/1986 | Miller |
| 4,847,122 A | 7/1989 | Goldberg et al. |
| 4,950,375 A | 8/1990 | Leger |
| 5,126,170 A | 6/1992 | Zweiner et al. |
| 5,174,024 A | 12/1992 | Sterrett |
| 5,236,741 A | 8/1993 | Zweiner et al. |
| 5,243,012 A * | 9/1993 | Wicks et al. ............... 528/58 |
| 5,306,120 A | 4/1994 | Hammer et al. |
| 5,449,273 A | 9/1995 | Hertel et al. |
| 5,466,771 A | 11/1995 | Hicks et al. |
| 5,486,096 A | 1/1996 | Hertel et al. |
| 5,489,704 A * | 2/1996 | Squiller et al. ............ 560/35 |
| 5,542,820 A | 8/1996 | Eaton et al. |
| 5,611,102 A | 3/1997 | Lesinsky et al. |
| 5,717,024 A * | 2/1998 | Kukkala et al. ............ 524/591 |
| 5,726,272 A | 3/1998 | Yonek |
| 5,736,604 A | 4/1998 | Luthra |
| 5,743,494 A | 4/1998 | Giamati et al. |
| 5,847,195 A * | 12/1998 | Roesler ...................... 560/35 |
| 5,881,972 A | 3/1999 | Smith et al. |
| 5,908,522 A | 6/1999 | Lofstrom et al. |
| 6,013,326 A | 1/2000 | Flosbach et al. |
| 6,341,747 B1 | 1/2002 | Schmidt et al. |
| 6,352,658 B1 | 3/2002 | Chang et al. |

(Continued)

FOREIGN PATENT DOCUMENTS

| BE | 752261 | 1/1970 |
| DE | 1022789 | 9/1956 |
| DE | 1092007 B | 11/1960 |
| DE | 1222067 B | 8/1966 |
| DE | 2004048 A1 | 12/1970 |
| DE | 2504400 A1 | 8/1976 |
| DE | 2537685 A1 | 3/1977 |
| DE | 2552350 A1 | 5/1977 |
| EP | 1038897 A2 | 9/2000 |
| EP | 1295649 A2 | 3/2003 |

(Continued)

OTHER PUBLICATIONS

MIL-STD-7179 (Sep. 30, 1997).*
MILC-85322B (with Amendments 1 and 2) (May 1989, Mar. 1994 and Sep. 1999).*
Hong, Shek C., U.S. Army Field Trial of Hontek Coatings on Black Hawk Helicopters, Apr. 2007, Aging Aircraft Conference.

(Continued)

Primary Examiner — Patrick Ryan
Assistant Examiner — Aaron Greso
(74) Attorney, Agent, or Firm — MKG, LLC

(57) ABSTRACT

A polyurethane or polyurea coating for use in protecting a leading edge substrate on an airfoil against liquid or solid particle erosion, the composition made from an isocyanate-terminated prepolymer and curing agents, such as polyaspartic esters, aldimines and ketimines with optional flatting agent for matte coatings.

38 Claims, No Drawings

(56) References Cited

U.S. PATENT DOCUMENTS

| | | |
|---|---|---|
| 6,399,736 B1 | 6/2002 | Primeaux, II et al. |
| 6,432,543 B2 | 8/2002 | Harrison et al. |
| 6,436,540 B1 | 8/2002 | Garcia et al. |
| 6,461,689 B1 | 10/2002 | Gauthier et al. |
| 6,649,107 B2 | 11/2003 | Harrison et al. |
| 6,747,117 B2 | 6/2004 | Gajewski |
| 6,828,405 B1 | 12/2004 | Cai |
| 6,875,390 B2 | 4/2005 | Cowelchuk |
| 6,878,771 B2 | 4/2005 | Urs |
| 7,033,673 B2 | 4/2006 | Wiedemann et al. |
| 7,115,225 B2 | 10/2006 | Parrish et al. |
| 7,736,745 B2 | 6/2010 | Hong |
| 2002/0103326 A1* | 8/2002 | Primeaux et al. ............... 528/84 |
| 2002/0160205 A1 | 10/2002 | Garcia et al. |
| 2004/0063844 A1* | 4/2004 | Urs .............................. 524/492 |
| 2004/0063894 A1 | 4/2004 | Danielmeier et al. |
| 2004/0067315 A1 | 4/2004 | Niesten et al. |
| 2004/0096331 A1 | 5/2004 | Leach |
| 2004/0118978 A1 | 6/2004 | Anning |
| 2005/0100674 A1 | 5/2005 | Brown et al. |
| 2005/0169763 A1 | 8/2005 | Anning |

FOREIGN PATENT DOCUMENTS

| | | |
|---|---|---|
| EP | 1403245 A1 | 3/2004 |
| GB | 761626 | 11/1956 |
| GB | 994890 | 6/1965 |
| NL | 7102524 | 8/1971 |
| WO | 02072420 A1 | 9/2002 |
| WO | 2006055038 | 5/2006 |

OTHER PUBLICATIONS

E. Charves, Synthesized Ketimine a replacement curing agent for MOCA, Jan. 22, 1976, Naval Air Systems Command, Dept of Navy, Washington, DC.

Shek C. Hong, Advanced Rain and Dust Erosion Resistant Coating Systems, Nov. 5-9, 2000, 32nd International Sample Technical Conference.

Shek C. Hong, Advanced Rain and Dust Erosion Resistant Coating Systems, May 22-24, 2001, Aerospace Coatings Removal and Coatings Conference, San Antonio.

Shek C. Hong, High Performance Rain and Sand Erosion Resistant Sprayable Coatings and Molding Resins for Aircraft, Feb. 2005, The 8th Joint NASA/FAA/DOD Conf. on Aging Aircraft.

International Search Report and Written Opinion for PCT/US2006/048092 dated Jul. 8, 2007.

International Search Report and Written Opinion for PCT/US2008/065480 dated Aug. 27, 2008.

Erapol E90A, High Performance Polyether Based Urethane Elastomer, Feb. 20, 2003.

* cited by examiner

EROSION RESISTANT COATINGS FOR LEADING EDGES OF AIRFOILS

CROSS REFERENCE TO RELATED APPLICATIONS

This application is a continuation of U.S. patent application Ser. No. 11/136,827 filed on May 24, 2005, issued as U.S. Pat. No. 7,736,745, which claims the benefit of U.S. Provisional Application Ser. No. 60/573,819 filed May 24, 2004 and U.S. Provisional Application Ser. No. 60/649,443 filed Feb. 2, 2005, the entire contents of which are hereby incorporated by reference.

STATEMENT REGARDING FEDERALLY SPONSORED RESEARCH AND DEVELOPMENT

This research was conducted with a combination of government and private funding. Government funding was provided under Small Business Innovation Research Contract No. F33615-99-C-5016 and F33615-01-5005 awarded by the United States Air Force.

BACKGROUND

This disclosure relates to abrasion resistant coatings. More specifically, this disclosure relates to coatings that afford protection against abrasion, wear, vibration, solid particle erosion and liquid particle erosion.

Rain and sand erosion damage on leading edge surfaces of helicopter rotor blades, propeller blades, aircraft wings, radomes, and antenna are well-known problems. Metallic coatings derived from metal such as, for example, nickel, titanium, stainless steel, or the like, generally provide good resistance to erosion damage. These metallic coatings, however, have many disadvantages. They have poor sand erosion resistance and may spark upon impact with sand particles. In addition, they reflect light and radar signals, making them undesirable for military operations.

In order to overcome problems with the metallic coatings, coatings comprising polymers (polymeric coatings) have been used. The polymeric coatings are generally modified to have a low gloss by the incorporation of flatting agents. They are additionally modified by the incorporation of dyes and colorants to have a color similar to that of the rest of the aircraft, in order to minimize detection. These addition of the flatting agents and colorants to the coating reduces the ductility of the coatings and makes them more susceptible to rain and/or sand erosion. In particular, the use of flatting agents to attain low gloss causes a decrease in the elongation to break and a substantial reduction in the rain and/or sand erosion resistance.

In U.S. Pat. No. 4,110,317 to Moraveck, urethane coatings having improved weather and protective properties are provided by applying and curing in an atmosphere containing moisture a coating composition comprising (1) an isocyanate-terminated prepolymer comprising of the reaction product of (a) a polytetramethylene ether glycol having an average molecular weight between about 500 and about 700, (b) an oxyalkylated triol having an average molecular weight between about 400 and about 1000 in an amount between 0 and about 20 percent by weight based on the combined weight of the oxyalkylated triol and the polytetramethylene ether glycol, and (c) an organic diisocyanate and (2) an inert organic solvent. However, the percent elongation at break for these compositions is not very high.

In military specification, MIL-C-85322B (2), titled "Coating, elastomeric, polyurethane, rain erosion", published in 1999 by the Naval Air System Command, the specification calls for polyurethane coatings based on TDI-prepolymer and a ketimine or other amine type curing agent. The disclosed physical property requirements are a minimum tensile strength of 1000 psi and a minimum elongation at break of 350% as determined by ASTM D2370. No mention of Shore A hardness or tensile set recovery are disclosed. Chemglaze M331 and Aeroglaze M1433, both manufactured by Lord Corporation, are qualified under MIL-C-85322. The coatings are based on TDI prepolymer and a ketimine (methylene dianiline). There is no disclosure of physical properties in the M1433 product datasheet. The M331 datasheet discloses that the physical properties of a cured M331 coating has a tensile strength of 350 kg/cm$^2$, an elongation at break of 500% and a Shore A hardness of 95. Aeroglaze is available only in gloss gray color and Chemglaze only in gloss black color. No low gloss versions are available to meet the demand of the modern military requirements.

In military specification, MIL-C-83231, titled "Coatings, polyurethane, rain protective for exterior aircraft and missile plastic parts", issued in 1969 and later replaced by SAE-AMS-C-83231 in 1999, the specifications call for polyurethane coatings based on moisture or non-moisture curing mechanism. There is no reference to the requirements of physical properties in tensile strength, elongation at break, tensile set at break (recovery) and Shore A hardness. CAAPCOAT B-274 and AS-P108 available from Caap Co. was approved under this specification.

CAAPCOAT B-274, available in black, is a polyurethane rain erosion coating qualified under MIL-C-83231A, Type II, Class A, and Composition L. According to its Materials Safety Datasheet (MSDS), it is based on methylene bis(4-cyclohexylisocyanate terminated polyester prepolymer. The curing agent is based on aliphatic amine. The accelerator is dibutyl tin dilaurate. CAAPCOAT AS-P108 antistatic polyurethane rain erosion coating is based on TDI-isocyanate terminated polytetramethylene glycol prepolymer. Its catalyst contains triethylene diamine and dipropylene glycol.

In MIL-C-83445, titled "Coating system, polyurethane, non-yellowing white, rain protective, thermally reflective", issued in 1974 and later replaced by SAE-AMS-C-85445 in 1999, the specification calls for polyurethane coatings based on aliphatic or cycloaliphatic prepolymers. There is no reference to the requirements of physical properties in tensile strength, elongation at break, tensile set at break (recovery) and Shore A hardness. The only commercial product qualified under this specification was Caapcoat C-W4. Its product datasheet discloses that it has a minimum tensile strength of 210 kg/cm$^2$ and a minimum elongation of at break of 350%. There is no disclosure of tensile set at break (recovery) and Shore A hardness. According to its MSDS, it is based on methylene bis(4-cyclohexylisocyanate terminated polyester prepolymer. The curing agent is an aliphatic amine. The accelerator is dibutyl tin dilaurate.

The above three military standards do not specify the 85 degree gloss requirement, and hence the aforementioned coatings are supplied in high gloss black, gray or white. However, the present day military applications specify low gloss sprayable coatings with an 85 degree gloss values of about 3 to about 5.

Erosion resistance coatings can generally include a base coat layer and a top coat layer. A widely used commercial polyurethane protective coating system in low gloss gray is CAAPCOAT FP®-250, which consists of CAAPCOAT® FP-200, a high gloss polyurethane base coat and FP-050, which is a lusterless polyurethane top coat. CAAPCOAT FP®-200 color matched gloss polyurethane rain erosion coating is based on chemistry similar to the C-W4. Its technical data sheet indicates that it has a minimum tensile strength at break of 210 kg/cm$^2$ and a minimum elongation at break of 350%. The FP-050, lusterless top coat, has a minimum tensile strength of 315 kg/cm$^2$ and a minimum elongation at break of 300%.

None of the above sprayable coatings are satisfactory for today's military applications as low gloss erosion protection coatings and there is therefore a need for protective coatings that can meet present day military specifications.

SUMMARY

A method of protecting a substrate against damage comprising disposing on a substrate one or more coatings, wherein one coating comprises an isocyanate-terminated polyurethane prepolymer and a curing agent; wherein the curing agents comprise polyaspartic esters, ketimines, aldimines, or a combination comprising at least one of the foregoing curing agents; reacting the isocyanate-terminated polyurethane prepolymer with a curing agent; wherein the reacting can optionally be carried out in the presence of moisture or heat; and curing the isocyanate-terminated polyurethane prepolymer to form the coating.

DETAILED DESCRIPTION

It is to be noted that as used herein, the terms "first," "second," and the like do not denote any order or importance, but rather are used to distinguish one element from another, and the terms "the", "a" and "an" do not denote a limitation of quantity, but rather denote the presence of at least one of the referenced item. Furthermore, all ranges disclosed herein are inclusive of the endpoints and independently combinable.

Disclosed herein are coating compositions and coatings that can be advantageously used to provide resistance to abrasion, wear and erosion in a variety of substrates. The coating composition comprises an organic polymer, a flatting agent and an optional solvent. An exemplary organic polymer comprises a polyurethane elastomer and/or a polyurea elastomer. The coatings advantageously have an elongation of greater than or equal to about 350%, an 85 degree gloss of about 3 to about 5, and provide resistance against wear, abrasion, erosion, impact and vibration, or the like, for a time period of greater than or equal to about 100 minutes. In one embodiment, the substrate can be coated by spray coating, dip coating, brush coating, electrostatic painting, or the like. In another embodiment, the coating composition can be molded and affixed to the substrate to provide resistance against abrasion, wear and erosion.

The term coating composition refers to a fluid composition that is sprayable or that can be brushed onto the substrate, or into which the substrate can be dipped. The term coating refers to a layer that is derived from the coating composition and is substantially free from water and/or solvent and that has undergone curing in an amount effective to form an elastomer. A protective coating as defined as one that is disposed directly or indirectly upon the substrate and can comprise one or more layers, one of which is derived from the coating composition. The term "disposed indirectly" refers to a coating that is separated from the substrate by other layers, while the term "disposed directly" refers to layers that in intimate physical contact with the substrate.

In one exemplary embodiment, the protective coating can comprise a layer of primer, a base coat layer, an optional tie layer and a top coat layer, wherein one of these layers is derived from the coating composition and generally has a tensile strength of greater than or equal to about 1000 psi (70 kg/cm$^2$), a tensile elongation at break of greater than or equal to about 350% for sprayable coatings, a tensile set at break of less than or equal to about 60%, a Shore A hardness of about 44 A to about 93 A and an optional 85 degree gloss value of about 3 to about 5. In some embodiments, the base coat layer is optional, while in other embodiments, the top coat layer is optional.

The protective coating advantageously combines properties of high tensile strength with a high elongation at break and a low gloss (matte surface finish). In one embodiment, the protective coating has a tensile strength of greater than or equal to about 1000 psi (70 kg/cm$^2$), a tensile elongation at break of greater than or equal to about 350% for sprayable coatings, a tensile set at break of less than or equal to about 60%, a Shore A hardness of about 44 A to about 93 A and an 85 degree gloss value of about 3 to about 5. In another embodiment, the coating can have a tensile elongation at break of greater than or equal to about 425%, preferably greater than or equal to about 600%, preferably greater than or equal to about 700%, and more preferably greater than or equal to about 800%, while having a matte surface finish. As used herein the equivalent terms "matte" "flat" or "low-gloss" coating is as set out in ASTM D 523-89 (1999) wherein a flat coating is defined as a coating that registers gloss less than 15 on an 85-degree meter or less than five on a 60-degree meter in accordance with the ASTM method.

The resistance against wear, abrasion, erosion, impact and vibration is afforded even at very high velocities, impacts and rate of impact. The coating composition can therefore be advantageously used to coat the leading edge and foreword facing structures of vehicles, such as, for example, aircraft wings, helicopter rotor blades, propeller blades, nose cones, radomes, fan blades, antennas, or the like, to protect them from damage due to rain, dust and/or sand. Vehicles as used herein refer to aircraft, automobiles, locomotives, ships, or the like. Other applications may include coatings for gold balls, mining equipment, railcar liners, stone impact protection coatings for motor vehicles, flexible adhesives, gap fillers, vibration and motion dampening, sound dampening, windshield crack filler, noise control, electronic encapsulation, glass lamination, textile coatings, leather coatings, and other areas in which the substrates are subjected to damage caused by wear, abrasion, erosion, impact and vibration, or the like.

Organic polymers that can be used in the coating composition as well as in the coating are thermoplastic polymers, thermosetting polymers, or blends and copolymers of thermoplastic polymers with thermosetting polymers. Examples of suitable organic polymers are dendrimers, elastomers, ionic polymers, copolymers such as block copolymers, graft copolymers, random copolymers, star block copolymers, or the like. Exemplary organic polymers are elastomers. An exemplary elastomer comprises polyurethane and/or a polyurea.

The organic polymers can comprise polyacetals, polyureas, polyurethanes, polyolefins, polyacrylics, polycarbonates, polyalkyds, polystyrenes, polyesters, polyamides, polyaramides, polyamideimides, polyarylates, polyarylsulfones, polyethersulfones, polyphenylene sulfides, polysulfones, polyimides, polyetherimides, polytetrafluoroethylenes, polyetherketones, polyether etherketones, polyether ketone ketones, polybenzoxazoles, polyoxadiazoles, polybenzothiazinophenothiazines, polybenzothiazoles, polypyrazinoquinoxalines, polypyromellitimides, polyquinoxalines, polybenzimidazoles, polyoxindoles, polyoxoisoindolines, polydioxoisoindolines, polytriazines, polypyridazines, polypiperazines, polypyridines, polypiperidines, polytriazoles, polypyrazoles, polycarboranes, polyoxabicyclononanes, polydibenzofurans, polyphthalides, polyacetals, polyanhydrides, polyvinyl ethers, polyvinyl thioethers, polyvinyl alcohols, polyvinyl ketones, polyvinyl halides, polyvinyl nitriles, polyvinyl esters, polysulfonates, polysulfides, polythioesters, polysulfones, polysulfonamides, polyureas, polyphosphazenes, polysilazanes, polyolefins, polysiloxanes, fluoropolymers, polybutadienes, polyisoprenes, or a combination comprising at least one of the foregoing organic polymers. Exemplary organic polymers are polyurethanes and/or polyureas. It is desirable for the polyurethane or the polyurea to be an elastomer. The aforementioned organic polymers listed above can be blended and/or copolymerized with the polyurethane or polyurea if desired.

The polyurethane elastomer comprises isocyanates having the general formula:

$$R(NCO)i \quad (I),$$

wherein R is an organic radical having the valence of i, wherein i is greater than or equal to about 2. R can be a substituted or unsubstituted hydrocarbon group (e.g., a methylene group or an arylene group).

The isocyanates can be aromatic or aliphatic. Useful aromatic diisocyanates can include, for example, 2,4-toluene diisocyanate and 2,6-toluene diisocyanate (each generally referred to as TDI); mixtures of the two TDI isomers; 4,4'-diisocyanatodiphenylmethane (MDI); p-phenylene diisocyanate (PPDI); diphenyl-4,4'-diisocyanate; dibenzyl-4,4'-diisocyanate; stilbene-4,4'-diisocyanate; benzophenone-4,4'-diisocyanate; 1,3- and 1,4-xylene diisocyanates; or the like, or a combination comprising at least one of the foregoing aromatic isocyanates. Exemplary aromatic diisocyanates for the preparation of polyurethane prepolymers include TDI, MDI, and PPDI.

Useful aliphatic diisocyanates can include, for example, 1,6-hexamethylene diisocyanate (HDI); 1,3-cyclohexyl diisocyanate; 1,4-cyclohexyl diisocyanate (CHDI); the saturated diphenylmethane diisocyanate known as H(12)MDI; (also known commercially as bis{4-isocyanatocyclohexyl}methane, 4,4'-methylene dicyclohexyl diisocyanate, 4,4'-methylene bis(dicyclohexyl)diisocyanate, methylene dicyclohexyl diisocyanate, methylene bis (4-cyclohexylene isocyanate), saturated methylene diphenyl diisocyanate, and saturated methyl diphenyl diisocyanate), isophorone diisocyanate (IPDI); or the like; or a combination comprising at least one of the foregoing isocyanates. An exemplary aliphatic diisocyanate is H(12)MDI.

Other exemplary polyisocyanates include hexamethylene diisocyanate (HDI), 2,2,4- and/or 2,4,4-trimethyl-1,6-hexamethylene diisocyanate, dodecamethylene diisocyanate, 1,4-diisocyanatocyclohexane, 1-isocyanato-3,3,5-trimethyl-5-isocyanatomethylcyclohexane (IPDI), 2,4'- and/or 4,4'-diisocyanato-dicyclohexyl methane, 2,4- and/or 4,4'-diisocyanato-diphenyl methane and mixtures of these isomers with their higher homologues which are obtained by the phosgenation of aniline/formaldehyde condensates, 2,4- and/or 2,6-diisocyanatotoluene and any mixtures of these compounds.

In one embodiment, derivatives of these monomeric polyisocyanates can be used. These derivatives include polyisocyanates containing biuret groups as described, for example, in U.S. Pat. Nos. 3,124,605, U.S. Pat. No. 3,201,372 and DE-OS 1,101,394; polycyanates containing isocyanurate groups as described, for example, in U.S. Pat. No. 3,001,973, DE-PS 1,022,789, 1,222,067 and 1,027,394 and DE-OS 1,929,034 and 2,004,048; polyisocyanates containing urethane groups as described, for example, in DE-OS 953,012, BE-PS 752,261 and U.S. Pat. Nos. 3,394,164 and 3,644,457; polyisocyanates containing carbodiimide groups as described in DE-PS 1,092,007, U.S. Pat. No. 3,152,162 and DE-OS 2,504,400, 2,537,685 and 2,552,350; and polyisocyanates containing allophanate groups as described, for example, in GB-PS 994,890, BE-PS 761,626 and NL-OS 7,102,524. In another embodiment, N,N',N"-tris-(6-isocyanatohexyl)-biuret and mixtures thereof with its higher homologues and N,N',N"-tris-(6-isocyanatohexyl)-isocyanurate and mixtures thereof with its higher homologues containing more than one isocyanurate ring can be used.

R in the formula (I) can also represent a polyurethane radical having a valence of i, in which case R(NCO)i is a composition known as an isocyanate-terminated polyurethane prepolymer or semi-prepolymer. Prepolymers or semi-prepolymers are formed when an excess of organic diisocyanate monomer is reacted with an active hydrogen containing component.

In one embodiment, the active hydrogen containing component is a polyol. In one embodiment, the prepolymers and semi-prepolymers may suitably be prepared from low molecular weight polyol compounds having a molecular weight of 62 to 299. The polyols can also have a molecular weight of about 300 to about 20,000, preferably about 500 to about 10,000, more preferably about 1000 to 5000, as determined from the functionality and the OH number. In one embodiment, the polyols can have at least two hydroxyl groups per molecule and generally have a hydroxyl group content of about 0.5 to 17 wt %, preferably about 1 to 5 wt %.

Examples of suitable polyols are polyester polyols, polycaprolactone polyols, polyether polyols, polyhydroxy polycarbonates, polyhydroxy polyacetals, polyhydroxy polyacrylates, polyhydroxy polyester amides and polyhydroxy polythioethers. Exemplary polyols are polyester polyols, polyether polyols, polyesters derived from lactones (e.g., ∈-caprolactone or ω-hydroxycaproic acid), or a combination comprising at least one of the foregoing polyols.

Suitable polyester polyols include reaction products of polyhydric or dihydric alcohols with polybasic or preferably dibasic carboxylic acids. Instead of these polycarboxylic acids, the corresponding carboxylic acid anhydrides or polycarboxylic acid esters of lower alcohols or mixtures thereof may be used for preparing the polyester polyols. The polycarboxylic acids may be aliphatic, cycloaliphatic, aromatic and/or heterocyclic and they may be substituted (e.g., by halogen atoms), and/or unsaturated. Examples include succinic acid, adipic acid, suberic acid, azelaic acid, sebacic acid, phthalic acid, isophthalic acid, terephthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimeric and trimeric fatty acids such as oleic acid, which may be mixed with monomeric fatty acids, dimethyl terephthalates, bis-glycol terephthalate, or the like, or a combination comprising at least one of the foregoing. Polyesters of lactones, e.g. ∈-caprolactone or hydroxy-carboxylic acids, e.g. ω-hydroxycaproic acid, may also be used.

The polyether polyols are obtained by the chemical addition of alkylene oxides, such as, for example, ethylene oxide, propylene oxide and mixtures thereof, to water, or polyhydric alcohols, such as, for example, ethylene glycol, propylene glycol, trimethylene glycol, 1,2-butylene glycol, 1,3-butanediol, 1,4-butanediol, 1,5-pentanediol, neopentyl glycol, cyclohexane dimethanol (1,4-bis-hydroxymethylcyclohexane), 2-methyl-1,3-propanediol, 2,2,4-trimethyl-1,3-pentanediol, triethylene glycol, tetraethylene glycol, polyethylene glycol, dipropylene glycol, polypropylene glycol, polytetramethylene glycol, dibutylene glycol and polybutylene glycol, glycerine, trimethylolpropane, or the like, or a combination comprising at least one of the foregoing polyhydric alcohols.

Examples of suitable starting molecules for the polyether polyols include monomeric polyols, water, organic polyamines having at least two NH bonds and mixtures of these starting molecules. Ethylene oxide and/or propylene oxide are particularly suitable alkylene oxides for the alkoxylation reaction. These alkylene oxides may be introduced into the alkoxylation reaction in any sequence or as a mixture.

Suitable polyhydroxy polycarbonates include those obtained by reacting diols, such as, for example, 1,3-propanediol, 1,4-butanediol and/or 1,6-hexanediol, diethylene glycol, triethylene glycol or tetraethylene glycol with diarylcarbonates or cyclic carbonates. The reaction between the diols and the diarylcarbonates or the cyclic carbonates takes place in the presence of phosgene. Also suitable are polyester carbonates obtained by reacting the previously described polyesters or polylactones with phosgene, diaryl carbonates or cyclic carbonates.

The prepolymers generally have an isocyanate content of about 0.5 to about 40 weight percent (wt %), based on the weight of the prepolymer after reaction. In one embodiment, the prepolymers generally have an isocyanate content of about 1 to about 20 wt %, based on the weight of the prepolymer after reaction. The prepolymer is generally manufactured using starting materials at an NCO/OH equivalent ratio of about 1.05:1 to about 10:1, preferably about 1.1:1 to about 3:1. The reaction is optionally followed by the distillative removal of any unreacted volatile starting polyisocyanates still present.

Exemplary isocyanate prepolymers are TDI-ether, TDI-ester, TDI-lactone, MDI-ether, MDI-ester, H12MDI-ether, H12MDI-ester and similar prepolymers made from HDI, IPDI and PPDI. The isocyanate prepolymers with low free isocyanate monomers are preferred. Although the examples present isocyanate-terminated prepolymers based on TDI and H12MDI, it is expected that other prepolymers and curing agents can be used to formulate the highly rain protective coating having tensile strength of greater than 70 kg/cm$^2$, elongation at break of higher than 350%, and tensile set value of less than 150%, as defined in this specification. Examples of suitable prepolymers are available from Air Products, Uniroyal, Bayer, Anderson Development and other polyurethane raw material suppliers.

In general, those prepolymers that are useful in forming polyurethane elastomers with MOCA (4,4'-methylenebis (orthochloroaniline) (MBCA) can be used. Those prepolymers that produce elastomers of 40 A-75 D with MOCA, or polyols can be used.

Examples of suitable commercially available prepolymers are AIRTHANE® series, VERSATHANE®, ADIPRENE® and VIBRATHANE® prepolymers, all of which are commercially available from Air Products. Especially preferred are those with very low free isocyanate monomers, such as AIRTHANE® PET series, ADIPRENE® LF-SERIES and VERSATHANE®. Examples of preferred prepolymers are: AIRTHANE® PEP-70A, PHP-70A, PET-80A, PET-85A, PET-90A, PET-91A, PET-93A, PET-95A, AIRTHANE® PET-60D, AIRTHANE® PHP-70D, AIRTHANE® PET-70D. VERSATHANE® A-7QM, VERSATHANE® A-75QMSP, VERSATHANE® A-8QM, VERSATHANE® A-85QM, VERSATHANE® A-8, VERSATHANE® A-85L, VERSATHANE® A-9, VERSATHANE® A-9QM, VERSATHANE® D-5QM, VERSATHANE® D-5QM, VERSATHANE® D-55, VERSATHANE® D-7, VERSATHANE®-C 2070, VERSATHANE®-C 1080, VERSATHANE®-C 1090, VERSATHANE®-C 1050, VERSATHANE®-C 1160, AIRTHANE® PST-70A, PST-80A, PST-85A, PST-90A, and PST-95A.

Other examples of suitable prepolymers are ADIPRENE® and VIBRATHANE® isocyanate terminated prepolymers supplied by Uniroyal Chemical Company. For example, VIBRATHANE® 6060 TDI-polylactone, ADIPRENE® LW-520 (H12MDI), LW-570 (H12MDI), ADIPRENE® HDI Prepolymer LFH 1570, LFH120, LFH710, ADIPRENE® PPDI-prepolymers LFP1950A (ester), LFP2950A (lactone), LFP590D (ether), LFP850A (ether), LFP950A (ether). Other VIBRATHANES® and ADIPRENE® extreme grades may also be used.

Other useful commercially available aromatic and aliphatic prepolymers are BAYTEC® WE-180 (Isocyanate-terminated PTMEG prepolymer based on HMDI, 18% isocyanate (NCO)) and BAYTEC® WP-260 (Isocyanate-terminated PPG Polyether prepolymer based on HMDI, 26% NCO).

Other aliphatic prepolymers available from Anderson Development Company include ANDUR® AL80-5AWFP, AL80-5AP, and AL-80-5AP.

The prepolymers are generally present in the coating composition in an amount of about 10 wt % to about 95 wt %, based on the total weight of the coating composition. An exemplary amount of prepolymer is about 20 to 70 wt %, based on the total weight of the coating composition.

The coating composition also comprises an optional curing agent. Examples of suitable curing agents are polyaspartic esters, aldimines, ketimines, amines, polyols, or the like, or a combination comprising at least one of the foregoing curing agents. In one embodiment, suitable diamines can be converted into corresponding aldimine or ketimines for use in sprayable coating compositions. In another embodiment, aldimines or ketimines and polyaspartic esters can be beneficially combined in the same coating formulation to provide improved properties. Amines may also be combined with the aldimines, ketimes, or the polyaspartic esters together to form the curing agents. Examples of suitable aspartic esters are those as disclosed in U.S. Pat. Nos. 5,126,170 and 5,236,741, incorporated herein by reference in their entireties. Other aspartic esters may be used as long as the combination with the prepolymer produce the high tensile, high elongation and low tensile set.

The polyaspartic ester has the general formula (II):

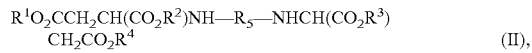

wherein $R^1$, $R^2$, $R^3$, and $R^4$ are the same or different and each are alkyl groups having an amount of about 1 to about 12 carbon atoms. In one embodiment, the alkyl groups have an amount of 1 to about 4 carbon atoms. An exemplary alkyl group is an ethyl group. $R_5$ can be aliphatic, alicyclic, or aromatic.

An exemplary polyaspartic ester is shown in formula (III):

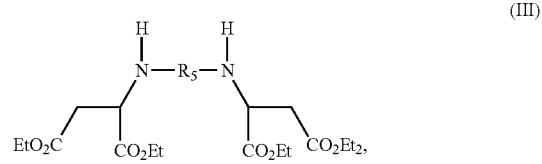

wherein $R_5$ can have the structures shown in formulas (IV)-(VII) below:

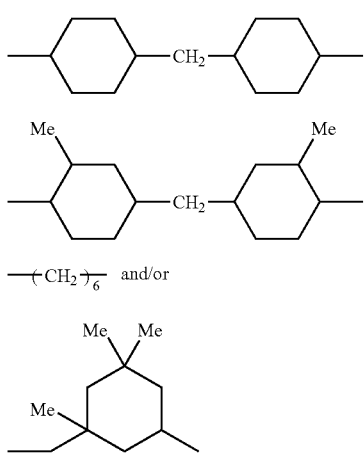

(IV)

(V)

(VI)

(VII)

wherein Me represents a methyl group.

Examples of suitable polyaspartic esters are DESMOPHEN® NH1220, NH1420, NH1521, NH1520, or PAC XP2528. Other polyaspartic esters and ketimines, such as DESMOPHEN® LS2965A, may also be used as long as these combinations with the prepolymer produce an elastomer having a high elongation at break and low tensile set.

Although polyaspartic esters have been marketed commercially for use with aliphatic polyisocyanates, it has been discovered that they are also suitable for use with TDI and/or MH12DI based prepolymers.

Examples of suitable aromatic amines that can be used as curing agents are phenylene diamine, 4,4'methylene-bis-(2-chloroaniline), 4,4'methylenedianiline (MDA), 4,4'methylenebis(2,6-diethylaniline), 4,4'methylenebis(2,6-dimethylaniline), 4,4'methylenebis(2-isopropyl-6-methylaniline), 4,4'methylenebis(2-ethyl-6-methylaniline), 4,4'methylenebis(2,6-isopropylaniline), 4,4'methylenebis(3-chloro-2,6-diethylaniline) (MCDEA), 1,3-propanediolbis(4-aminobenzoate), diethyltoluenediamine (DETDA), dimethylthiotoluenediamine; or the like; or a combination comprising at least one of the foregoing aromatic amines.

Examples of commercially available aromatic amines such as ETHACURE® 100, ETHACURE® 300, CLEAR LINK® series amines, VERSLINK® series amines, JAFFAMINE® series amines, VIBRACURE® series curatives, and UNILINK® series amines, or the like. In one embodiment, cyclic and aromatic polyols can be used to simulate an aromatic amine in forming a hard segment (rigid phase) in the polyurethane. Long chain polyols can be used like long chain polyamines to form the soft segments.

When polyaspartic esters are used as the curing agent, an optional co-curing agent can be used. Aldimines, ketimines, aromatic diamines and diols can be used as co-curing agents. Aldimines curing agents can be prepared from polyamines having cyclic groups. Aldimines used as curing agents have structures corresponding to the formula (VIII):

wherein $X_1$ represents an organic group that has a valency of n and is obtained by removing the amino groups from a cyclic organic polyamine having (cyclo)aliphatically-bound amino groups, preferably a diamine and more preferably a hydrocarbon group obtained by removing the amino groups from a diamine having at least one cycloaliphatically-bound amino group, $R_6$ and $R_7$ may be the same or different and represent organic groups which are inert towards isocyanate groups at a temperature of 100° C., or less, preferably containing 1 to 10, more preferably 1 to 6, carbon atoms, or $R_6$ and $R_7$ together with the β-carbon atom form a cycloaliphatic or heterocyclic ring and n represents an integer having a value of at least 2, preferably 2 to 6, more preferably 2 to 4 and most preferably 2.

Aldimine are generally preferred over ketimines for the longer pot life in sprayable coatings. Examples of suitable aldimines are latent aliphatic polyamines. Examples of commercially available aldimines are DESMOPHEN® PAC XP7076 and PAC XP7068. Other exemplary materials include DESMOPHEN® PAC XP7109, XP7083, and XP7069. Especially preferred are isophoronediamine aldimines (IPDA aldimines):

In one embodiment, the curing agent can comprise polyaspartic esters, ketimines, aldimines, or a combination comprising at least one of the foregoing curing agents. Examples of combinations of curing agents are polyaspartic esters with aldimines, polyaspartic esters with ketimines or aldimines with ketimines. The aldimine and polyaspartic ester of this invention can be used with any isocyanate-terminated prepolymers. In one embodiment, the aldimines and polyaspartic esters function as MOCA replacement for polyurethane/polyurea elastomers. The relative ratios of the prepolymer/curing agent that form the high elongation elastomers can be easily found by doing a series of trial formulations with various prepolymer-curing agent ratios. The optimum ratios depend on the chemical structures of the prepolymers and the curing agents, as a polyurethane elastomer is formed with rigid blocks and soft blocks. Rigid (cyclic) prepolymers can be paired with soft (linear) curing agents or vice versa. Cyclic curing agents and linear curing agents can be used. Examples of cyclic curing agents are aromatic diamines and cycloaliphatic diamines. Combination of di-, tri- or tetra functional curing agents may be used as long as the resulting physical properties do not deviate far from the desired values.

While this disclosure relates curable compositions based on isocyanate-terminated prepolymers, a person skilled in the art may design a curable resin system by shifting some of the polyols in the prepolymer into the curing agent side, and form an end product with similar properties to those with pre-reacted prepolymers.

As the aldimine and polyaspartic esters permit one of ordinary skill in the art to investigate the relationship of the physical properties of the coatings to their potential erosion resistance behaviors, a good overall correlation evolved after testing numerous compositions. The overall correlation is the subject of this invention. This correlation extends beyond the isocyanate-aldimine and polyaspartic chemistry. The same pattern exists with aqueous polyurethane dispersions that have been polymerized. Additional curing agent can be added, but can also be eliminated. The same pattern also exists with solid polyurethane elastomers.

If desired, the reaction between the prepolymer and the curative agent to form the polyurethane can take place in the presence of a catalyst. Examples of suitable catalysts include organometallic compounds, such as organotins, (e.g., dibutyltindilaurate, stannous octoate, or the like); tertiary amines, (e.g., triethylenediamine, triethylamine, n-ethylmorpholine, dimethylcyclohexylamine, 1,8-diazabicyclo-5,4,0-undecene-7, or the like), or a combination comprising at least one of the foregoing catalysts.

In one embodiment, the curing agent can be a multifunctional imine. The multi-functional imine may be represented by the formula (IX):

(IX)

wherein $R_8$, $R_9$, $R_{10}$, and $R_{11}$ are radicals that can be the same or different and wherein each is independently selected from the group consisting of hydrogen, an alkyl having from 1 to 10 carbon atoms and phenyl and wherein A may be any radical having a molecular weight from 26 to 7000.

In an exemplary embodiment, the multi-functional imine is a ketimine formed by the reaction of a primary di- or triamine with a ketone. The curing agent can be prepared by refluxing the primary amine and ketone or aldehyde together in the presence of an azeotroping agent such as benzene, toluene or xylene. Examples of suitable curing agents that are useful in the coating composition are 1,2-ethylene bis(isopentylidene imine), 1,2-hexylene bis(isopentylidene imine), 1,2-propylene bis(isopentylidene imine), p,p'-bisphenylene bis(isopentylidene imine), 1,2-ethylene bis(isopropylidene imine), 1,3-propylene bis(isopropylidene imine, p-phenylene bis (isopentylidene imine), m-phenylene bis(isopropylidene imine), 1,5-naphthylene bis(isopropylidene imine), or the like, or a combination comprising at least one of the foregoing imine curing agents.

In one embodiment, the isocyanate-terminated polyurethane prepolymer can be reacted with a ketimine or polyketimine to form ketimine functionalized polyurethane prepolymers. The ketimine functionalized polyurethane is then alkylated to form a crosslinked polyurethane. In addition to the aforementioned amines, low unsaturation polyols such as ACCLAIM® polyols or polyamines derived from ACCLAIM® polyols can be advantageously used.

In one embodiment, a curing agent is not used to effect the crosslinking. In this event, atmospheric moisture may serve to catalyze the reaction between the polyurethane and the curing agent. This is referred to as moisture cure. In another embodiment, the moisture cure can be used when the coating composition comprises curing agents such as polyaspartic esters, ketimines, aldimines, or a combination comprising at least one of the foregoing curing agents. The coating composition comprising the curing agents is exposed to moisture to facilitate the crosslinking reaction.

Flatting agents are added to lower the gloss of the coating surface. The flatting agent migrates to the surface of the coating as the coating is dried. This produces a rough surface that randomly scatters reflected light, which creates a matte surface finish (low gloss finish). Important considerations for selection of a flatting agent are particle size distribution, rheological effects, color/clarity, and ease of dispersion and good suspension in coating solution.

Examples of suitable flatting agents are fine particle powders of organic and inorganic materials, urea-formaldehydes, silicas such as, for example, precipitated silica and fumed silica, polymeric beads, talc, alumina, calcium carbonate, or the like, or a combination comprising at least one of the foregoing flatting agents. An exemplary flatting agent is silica. Examples of suitable silica flatting agents are "LO-VEL® 27" and "LO-VEL® 275" (ultrafine amorphous silica) commercially available from PPG Industries, Inc., Pittsburgh, Pa. and ACEMATT® TS-100 from Degussa.

It is desirable for the flatting agents to have average particle sizes of about 1 to about 20 micrometers. In one embodiment, the flatting agent has an average particle size of 2 to about 15 micrometers. In another embodiment, the flatting agent has an average particle size of 3 to about 12 micrometers.

The flatting agent is added to the coating composition in an amount of up to about 20 wt %, based on the total weight of the coating composition. In one embodiment, the flatting agent is added to the coating composition in an amount of about 1 to about 15 wt %, based on the total weight of the coating composition. In another embodiment, the flatting agent is added to the coating composition in an amount of about 2 to about 10 wt %, based on the total weight of the coating composition. In another embodiment, the flatting agent is added to the coating composition in an amount of about 3 to about 7 wt %, based on the total weight of the coating composition.

The coating composition also comprises an optional solvent. Solvents can include water and/or an organic solvent. Organic solvents may be protic solvents, aprotic solvents, or mixtures comprising at least one of the foregoing solvents. Examples of suitable organic solvents are toluene, xylene, butyl acetate, propyl acetate, methyl isobutyl ketone, methyl n-amyl ketone (MAK), methoxypropyl acetate, N-methylpyrrolidone, or a combination comprising at least one of the foregoing solvents. When the solvent substantially comprises water, then the coating composition and the coating obtained from the coating composition is referred to as being an aqueous coating composition and an aqueous coating respectively. When the solvent substantially comprises an organic solvent, then the coating composition and the coating is referred to as being a non-aqueous coating composition and a non-aqueous coating respectively.

Coating compositions can also be substantially solvent free. In those situations where the coating composition has a low enough viscosity (without the use of solvent or water), solvents (including water) may not be added to the coating composition and the coating composition is referred to as being 100% solids based.

When solvent is added to the coating composition, it is generally added in an amount of about 20 to about 60 wt %, based on the total weight of the coating composition. In one embodiment, the solvent is added to the coating composition in an amount of about 25 to about 55 wt %, based on the total weight of the coating composition. In another embodiment, the solvent is added to the coating composition in an amount of about 35 to about 50 wt %, based on the total weight of the coating composition. In yet another embodiment, the solvent is added to the coating composition in an amount of about 40 to about 45 wt %, based on the total weight of the coating composition.

For aqueous coatings, polyurethane dispersions can be used with or without curing agents. These polyurethane dispersions are generally commerically available. The polyurethane dispersions are pre-reacted polyurethanes polymers and may have free carboxyl, hydroxyl or other reactive functional groups for further crosslinking. The crosslinking of aqueous polyurethane dispersions may be accomplished by the use of isocyanates, epoxy, or aziridines functional materials. Different grades of aqueous polyurethane dispersions may be blended together to achieve the desired properties. The polyurethane dispersions may be used alone or in combination with the non-aqueous (solvent based) protective coatings.

For example, aqueous coatings may be used as the base coat and the nonaqueous coatings used as the top coat, or vice versa. In another method, alternating layers or any random combination of the aqueous and non-aqueous coatings may be sprayed sequentially to form the protective coating. This is possible because the moisture triggers the curing of aldimine or ketimine containing coatings and moisture also catalyzes the curing of polyaspartic ester cured coatings. In other words, the moisture present in an aqueous coating can facilitate the crosslinking reaction in an adjacent non-aqueous coating.

Other additives useful in the coating compositions include leveling agents, defoamers, hydrolysis stabilizers, UV stabilizers, pigments, dispersants, curing accelerators, diluents, or combinations thereof.

In one embodiment, fillers that impart electrical conductivity or thermal (heat) conductivity can be added to the coating composition. Examples of suitable heat conductive fillers are metal powders, metal flakes, metal fibers, milled metal fillers, alumina, graphite, boron nitride, aluminum nitride, surface treated or coated aluminum nitrides, silica coated aluminum nitride, carbon nanotubes, carbon fibers and milled carbon fibers, silicone carbide, or the like, or a combination comprising at least one of the foregoing additives.

Examples of suitable electrically conductive fillers are metal powders, metal flakes, metal fibers, milled metal fibers, metal-coated synthetic fibers, metal-coated glass spheres, metal-coated hollow spheres, graphite, carbon nanotubes, vapor grown carbon fibers, carbon fibers and milled carbon fibers, carbon coated synthetic fibers, buckyballs, electroactive polymers, antimony-doped tin oxide, conductive metal oxides such as indium tin oxide, tertiary ammonium salt compounds, carbon blacks, coke, or the like, or a combination comprising at least one of the foregoing electrically conductive fillers.

These fillers can be added to the coating composition at concentrations effective to obtain desired properties. Other fillers that can be used to control dielectric constants are well known. Examples include various metal oxides, metal powders, metal fibers, micro-balloons, or the like, or a combination comprising at least one of the foregoing fillers.

Other fillers that are used to control the interaction of the coating with electromagnetic radiation involved in radar devices, infrared detection devices can also be added to the base elastomers of this invention.

The coating composition can be applied in one or more layers to the substrate in order to create a protective coating. The coating composition can be applied by spraying, brush coating, immersion, flooding, by means of rollers, by using doctor applicators, or a combination comprising at least one of the foregoing processes. These processes are suitable for the formation of a protective coating on various substrates, e.g., metals, plastics, wood, cement, concrete or glass. It is desirable to apply one or more layers having a tensile strength of greater than or equal to about 1000 psi (70 kg/cm$^2$), a tensile elongation at break of greater than or equal to about 350%, a tensile set at break of less than or equal to about 60%, a Shore A hardness of about 44 A to about 93 A and an optional 85 degree gloss value of less than or equal to about 10, preferably about 3 to about 5.

The surface of the substrate to be coated with the coating composition may optionally be treated (i.e., cleaned) to improve adhesion to the substrate. The substrate may also optionally be treated by coating it with a layer of primer, a base coat layer, a tie layer and a top coat layer if desired. In one embodiment, the primer, the base coat layer as well as the top coat layer can all be derived from the coating composition. In another embodiment, only the top coat layer can be derived from the coating composition.

After the application of the optional primer and the base coat, the coating composition may be applied to the substrate to form a coating that offers a high resistance to impact, wear, abrasion and/or vibration. The coating can be applied in a single step or in multiple steps and can exist in the form of a single layer or multiple layers. The protective coating can therefore consist of a single layer of the coating composition applied to the substrate. Alternatively, the protective coating can comprise multiple layers, wherein one of the layers comprises a coating that is derived from the coating composition.

As discussed above, the substrate may optionally be treated prior to the application of the coating. The treatment is conducted for purposes of cleaning the surface of the substrate and for purposes of improving adhesion between the coating and the substrate. Treating the surface may involve mechanical roughening, grit blasting, sanding, cleaning, chemical etching, plasma treatment, chemical conversion coating, or other processes known to improve the adhesion to the substrate of primers or coatings applied later in the process.

As discussed above, treatment of the substrate may be followed by the application of an optional layer of primer and/or a top coat layer to the substrate. A primer is generally applied for corrosion protection, or to enhance the removal of the top coat layer when the substrate is to be refurbished. Examples of suitable corrosion resistant primers are epoxy and polyurethane coatings containing corrosion inhibitors. Wash primers comprising polyvinyl butyral chemistry are also used. The wash primers can assist the removal of the protective materials because of their solubility in solvents. An exemplary primer is a water borne epoxy primer because it permits the application of a top coat within one hour of its application. It also permits the application of a protective coating in less than or equal to about 8 hours of the application of the primer. The use of the water borne epoxy primer thus permits an improvement in speed of application and allows for productivity improvements over other commercially available primers.

When the layer of primer is applied to the substrate it generally has a thickness of about 0.5 to about 2.0 mils. A preferred thickness for the layer of primer is about 0.6 to about 1.2 mils.

The substrate having the layer of primer is then coated with an optional base coat layer. The base coat layer is applied within a limited time window, so as to facilitate optimum adhesion to the layer of primer. The time to spray varies with each primer formulation, as instructed by the manufacturers. For the exemplary water-borne epoxy primers, the base coats can be sprayed within about 1 to about 3 hours after the primer is sprayed. The base coat layer was dried at ambient temperature. The base coat layer can also be derived from the coating composition. In one embodiment, the coating composition for the base coat layer does not utilize flatting agents. It is desirable for the base coat layer to have a tensile strength of greater than or equal to about 1000 psi (70 kg/cm$^2$), a tensile elongation at break of greater than or equal to about 350%, a tensile set at break of less than or equal to about 60%, and a Shore A hardness of about 44 A to about 93 A. The base coat layer can be a high gloss, semi-gloss layer, low gloss or matte layer.

If the base coat layer and the layer of primer do not have suitable adhesion to each other, another tiecoat layer may be applied between the layer of primer and the base coat layer. For example, polyurethane base coat layer based on H12MDI has lower adhesion to a layer of epoxy primer. An example of a suitable tiecoat layer is an aqueous polyurethane layer or a TDI-based polyurethane layer. Other coatings may be used as long as they improve the adhesion between the layer primer and the base coat layer.

The coating composition comprising flatting agents may then be coated onto the base coat layer to form the top coat layer. As discussed above, the coating composition may be applied in a single layer or in multiple layers. In other words, the protective coating can comprise multiple layers, one of which has a tensile strength of greater than or equal to about 1000 psi (70 kg/cm²), a tensile elongation at break of greater than or equal to about 350% for sprayable coatings, a tensile set at break of less than or equal to about 60%, a Shore A hardness of about 44 A to about 93 A and an 85 degree gloss value of less than or equal to about 10, preferably about 3 to about 5.

As noted above, the coating composition may be applied to the substrate in a plurality of layers to form the coating. In one embodiment, the coating composition may be applied in an amount of up to seven layers. In another embodiment, the coating composition may be applied in an amount of up to six layers. In another embodiment, the coating composition may be applied in an amount of up to five layers. In another embodiment, the coating composition may be applied in an amount of up to four layers. In another embodiment, the coating composition may be applied in an amount of up to three layers. In yet another embodiment, the coating composition may be applied in an amount of up to two layers. These layers can have the same or different compositions.

As noted above, the coating can be formed from the coating composition in a variety of ways. In one embodiment, the coating can be formed by spraying, dipping, solution coating of the substrate. In another embodiment, a preformed sheet produced by spraying, dipping or solution coating of the coating composition is first prepared. The preformed sheet is then adhesively bonded to the substrate to afford resistance to erosion, wear and abrasion. In yet another embodiment, the coating composition can be molded to form a layer. The layer is then adhesively bonded to the substrate to form the protective coating. The molding can be accomplished through injection molding, compression molding, vacuum forming, blow molding, or the like. An exemplary method of forming the protective coating is by spraying the coating composition onto the substrate.

In one embodiment, after the application of the coating composition to the substrate, it can be cured by moisture curing and/or heat curing. If solvent is present in the coating composition, it is desirable to drive off substantially all of the moisture during the curing process. The coatings may be cured at either ambient temperature (e.g., by air drying or so-called forced drying), or at an elevated temperature (heat curing). A heat curing process to effect curing and to drive off the solvent can utilize heat from convection, conduction and/or radiation. Electromagnetic radiation in the form of microwave radiation, infrared radiation and/or ultraviolet radiation can be used to facilitate curing.

In the spraying process, coating compositions having different amounts and/or types of solvent can be used to form the coating layers on the substrate. For example, aqueous coatings can be used sequentially with non-aqueous coatings, especially when the non-aqueous coatings use the moisture curing mechanism. In this case, aqueous coating compositions can be used to apply the layer of primer and the tiecoat layer, while non-aqueous coating compositions can be used for an intermediate coat or final top coat layer. In another embodiment, the aqueous coating compositions can be used to form all of the protective coating layers (e.g., the layer of primer, base coat layer, tie layer, or the like) other than the top coat layer, while a non-aqueous coating composition is used as the final top coat.

In another method of using the coating composition, alternating layers or any random combination of the aqueous and non-aqueous coating compositions may be sprayed in any sequence to form the protective coating. This is possible because the moisture triggers the curing of polyurethane with aldimine or ketimine curing agents and moisture also catalyze the curing of polyaspartic ester cured coatings. The combined use of aqueous and non-aqueous sprayable coating compositions provides a method of reducing the overall water sensitivity of aqueous coatings, while reducing the amount of organic solvents used to form the protective coating.

As detailed above, it is desirable to have low gloss films for military applications. In one embodiment, in order to form a low gloss coating, three approaches can be used: 1) a coating composition that produces a coating having a matte (low gloss) surface can be used to coat the entire substrate. In this case, the entire thickness of the coating is obtained from a single coating composition; 2) coating compositions that form alternating high gloss and semigloss surfaces are used as base coats to form the bulk of the total protective coating thickness and a coating composition that produces a coating having a matte surface is used as a top coat layer to finish the visible surface; and 3) coating compositions that form high gloss and semigloss surfaces and coating compositions that produce matte surface finishes are used sequentially or randomly while the coating composition that produces the matte finish coating is used as a top coat layer to finish the visible surface.

In one embodiment, it is desirable to obtain maximum effect from the flatting agents present in the coating composition in order to produce a matte surface finish. In order to produce a matte surface finish, the last layer of the coating (e.g., top coat layer) having a matte surface needs to be sprayed after the base coat has cured to a solid state and a substantial amount of the solvents in the underlying layers has evaporated. When the top coat layer coating having the matte finish is sprayed too early (i.e., before substantial solvent evaporation has occurred), the flatting agents in the top coat layer may get absorbed into the underlying layers base coat and a higher gloss appearance results.

In general, protective sprayable coatings are used at a thickness of about 0.014" for leading edge protection of an aircraft. In order to achieve higher rain erosion resistance and reach the required thickness in reasonable amount of time, a higher solid gloss base coat is used to build up to the 0.012-0.013" thickness, and then followed by 0.001-0.002" of a low luster matte top coat.

In addition, there is a possibility of cracking in the top coat layer. These cracking patterns are due to the difference in the rate of shrinkage between the glossy base coat layer and top coat layer having the matte surface finish. In order to prevent such cracking, it is generally desirable for the underlying layers (i.e., the base coat layer) to be allowed to dry for a time period of about 1 to bout 4 hours before any additional coating composition is applied. The time period needed depends on the curing speed of the underlying layers and the ambient room temperature and humidity. The top coat layer having the matte surface finish should preferably be sprayed before the base coat layer is completely cured. Lower adhesion between the base coat layer and the top coat layer may result if the base coat layer is fully cured prior to the application of the top coat layer. The top coat layers are generally applied after a time period of about 1.5 to about 3 hours after the application of the base coat layer.

In another possible method of forming the protective coating, sprayable coatings may be sprayed over a releasable structure (tooling) of similar dimension and configuration as the substrate that is to be coated. Depending on the releasable structure, the sprayable coatings can be converted into boots, sheet, films, or tapes (called "cured forms" for this purpose). After drying and curing, the "cured forms" can be removed and used later on the substrate of similar dimensions and configuration. Adhesive can be used to bond the "cured forms". The sprayable coatings may be sprayed over the "cured form" if desired. While the coatings are still wet, the precured "form" can be bonded to the substrate using the protective coating as an adhesive. This method of affixing the protective coating saves the time and expense for field repair depots. Other adhesives may also be used.

For protective materials preformed into boots, films, sheets and tapes, the erosion protection layers can also be formed by adhesive bonding onto the substrate. The molded boots, films or sheets can be bonded to the substrate with the use of liquid primers and adhesives, or they can be precoated with a pressure sensitive adhesive or other dry adhesives. The adhesive is activated upon contact. In other processes, Part A of a two-part reactive adhesive system may be applied to the preformed boot or sheet, and Part B of the adhesive system may be applied to the prepared substrate. When the two sides are joined together, the adhesion chemistry is activated. In addition to the pure adhesive and primer, a layer of open mesh screen or fabric structure may be positioned in between the erosion protection layer and the substrate. The mesh or fabric serves as a physical gap to control the amount of the adhesive layer, and also acts as a mechanical layer to assist the stripping of the erosion protection layer or as an erosion indicator to show that it is time to replace the protective material when the layer becomes visible.

For non-aqueous or aqueous liquid materials, dry films of sufficient thickness were formed by spraying onto flat sheets or by casting the liquids in a "well" formed on flat substrate surrounded with gaskets or sealants. Another method is to use draw down gauge with sufficient gap to deposit sufficient amount of liquid onto the releasable sheets. After evaporation of the solvent or water and additional curing if needed, the dry films were removed. Polyethylene, polypropylene, silicone rubber, Teflon-coated aluminum, PP or PE-lined aluminum, or silicone fluid coated glass plates can be used to construct the "welled" plates to fill the liquid coating. For draw down or spraying, corona or flame treated HDPE film (0.010" thick) can be laminated to aluminum sheet to form releasable substrates to form the film for tensile testing.

As noted above, at least one of the layers of the protective coating formed from the coating composition advantageously has a tensile strength of greater than or equal to about 1000 psi (70 kg/cm$^2$), a tensile elongation at break of greater than or equal to about 350% for sprayable coatings, a tensile set at break of less than or equal to about 60%, a Shore A hardness of about 44 A to about 93 A and an 85 degree gloss value of less than or equal to about 10.

The coatings obtained from the coating composition have a tensile strength of greater than or equal to about 70 kg/cm$^2$. In one embodiment, the coatings have a tensile strength of greater than or equal to about 105 kg/cm$^2$. In another embodiment, the coatings have a tensile strength of greater than or equal to about 140 kg/cm$^2$. In yet another embodiment, the coatings have a tensile strength of greater than or equal to about 210 kg/cm$^2$.

The coatings also advantageously have a tensile elongation at break of greater than or equal to about 350%. In one embodiment, the coatings have a tensile elongation at break of greater than or equal to about 425%. In another embodiment, the coatings have a tensile elongation at break of greater than or equal to about 550%. In yet another embodiment, the coatings have a tensile elongation at break of greater than or equal to about 600%. Sprayed coatings generally exhibit tensile elongations at break of greater than or equal to about 450%.

The coatings also advantageously have a tensile set at break of less than or equal to about 60%. In one embodiment, the coatings have a tensile set at break of less than or equal to about 55%. In another embodiment, the coatings have a tensile set at break of less than or equal to about 50%. In yet another embodiment, the coatings have a tensile set at break of less than or equal to about 40%.

The coatings obtained from the coating composition can be high gloss or low luster. For military applications, an 85 degree gloss value of less or equal to about 10 is generally desirable. In one embodiment, the coatings have an 85 degree gloss of less than or equal to about 8. In another embodiment, the coatings have an 85 degree gloss of less than or equal to about 6. An exemplary value of 85 degree gloss is about 3 to about 5.

The coating also advantageously displays a Shore A hardness of about 44 A to about 93 A. In one embodiment, the coating displays a Shore A hardness of about 55 A to about 90 A. In another embodiment, the coating displays a Shore A hardness of about 65 A to about 85 A. In yet another embodiment, the coating displays a Shore A hardness of about 75 A to about 83 A. An exemplary value of hardness for the coating is about 60 to about 87 A.

The coating also advantageously displays a rain erosion resistance of greater than or equal to about 70 minutes, preferably greater than or equal to about 105 minutes and more preferably greater than or equal to about 120 minutes, when subjected to a rain erosion test under condition 1 described in the examples below.

As noted above, the coating can advantageously be used to protect the leading surfaces of airborne vehicles. The coating can be used to protect aircraft wings, helicopter rotor blades, propeller blades, nose cones, radomes, fan blades, antennas, or the like, to protect them from damage due to rain, dust and/or sand. Other applications may include coatings for gold balls, mining equipment, railcar liners, stone impact protection coatings for motor vehicles, flexible adhesives, gap fillers, vibration and motion dampening, sound dampening, windshield crack filler, noise control, electronic encapsulation, glass lamination, textile coatings, leather coatings, and other areas in which the substrates are subjected to damage caused by wear, abrasion, erosion, impact and vibration, or the like.

The following examples, which are meant to be exemplary, not limiting, illustrate compositions and methods for manufacturing the protective coatings described herein.

EXAMPLES

The physical properties were determined in test procedures similar to that of ASTM D412-92 "Standard Test Methods for Vulcanized Rubber and Thermoplastic Rubbers and Thermoplastic Elastomers-Tension". However, modifications were made to reflect the unusual characteristics of these materials, as explained in discussions in the following paragraphs.

To prepare specimens for testing, different procedures were used to accommodate the physical states of the materials. For tensile tests, it is desirable to use a dry film having a thickness of greater than or equal to about 0.006 inch (0.1524 millimeter). A preferred thickness is more preferably about 0.008 inch (0.2032 millimeter). Lower thicknesses can give an artificially higher tensile strength due to dimensional errors.

The flexible, high elongation materials were tested using a Chatillon TCD 500MH tensile tester, with 100 or 500 lb load cell and a Chatillon digital force gauge DFGS-R-ND. Both dumbbell shaped and straight rectangular specimens were used for the test. Straight specimens having a 1 inch width (25.4 millimeters)×4.5 inches (114.3 millimeters) length were used to prepare solvent based or water based coatings as well as the test specimens.

Dumbbell shaped specimens having dimensions prescribed by ASTM D412 Die C are generally used when the straight rectangular specimens cannot be broken or when they slipped out of the grips (sample holders used in a tensile testing machine). Sheets with thickness of higher than 0.020" may preferably be tested with dumbbell shaped test specimens. To determine the sample thickness to be used in the calculation of tensile properties, three thickness measurements are typically taken along both sides of the specimens within the open gap space, noting the uniformity and value of sample thickness at the thinnest location on the samples. The thinnest measurement is used for calculation since it is the most likely location of the tensile break, unless it is noted that the break point occurs at much different thickness locations. Data from defective specimens due to entrapped air bubbles or surface defects are not used.

Additional properties useful to determining high erosion resistance is the tensile set at break (elastic recovery) and Shore A hardness. The ASTM procedures in D882, D2370 and D412 each by themselves were not satisfactory for purposes of measuring each of these respective properties in the erosion resistant materials.

Because of the very high elongation of these materials, a grip separation speed of 20 inches per minute (508 millimeters per minute) was used. The distance between the grips (grip separation distance) was set at 1 inch (25.4 millimeters) or 2 inches (50.8 millimeters) apart. This initial grip separation distance was used as the baseline for calculation of the ultimate elongation at break. It was found that the same material tested at 25.4 millimeter grip separation distance gave a substantially higher percent elongation at break than a 50.8 millimeter grip separation distance. The grip separation distance of 50.8 millimeters was therefore used for calculation of the ultimate percent elongation at break.

The ultimate percent elongation at break was defined as follows:

Percent elongation=[(sample length at break−2 inches)/2 inches]×100

Because of the 8-ft ceiling of the test room and the set up of the grips, the net available travel distance of the grips on the 30-inch TCD 500 MH test machine was about 25 inches (625 millimeters). For those that did not break upon reaching the maximum height, the specimens were hand pulled till break to obtain the break force for use in calculating the tensile strength. The percent elongation at break for such samples is recorded as 1250+%.

It was later found that slippage of the specimens from the grips contributed to the artificially high values of elongation at break. Due to the high tensile and high elongation at break properties of these polymers, it was determined that the 2 inch (50.8 millimeter) gap separation distance was too large to break the specimens. It was decided to change the starting grip distance to 1 inch (25.4 millimeter) and use ASTM Die C for cutting test specimens, whenever the sample thickness was higher than 0.020 inch (0.508 millimeters), or if the specimens did not break when straight specimens were used for testing. To hold the test specimens tighter, the Chatillon GF-9 Universal Tensile Grips were lined with 200-grit sand paper over polyurethane sheet stock.

Other methods have been used in the industry to measure the tensile properties. The procedure of ASTM D882-92 was tried, but was found not practical. When used for 2 inch (25.4 millimeters) sample lengths and tensile elongation speeds of 20 inches/minute (508 millimeters/minute), the slippage of the test specimens inside the grip caused artificially high elongations at break. For ASTM D2370, the test calculates the elongation at break assuming no slippage inside the grips. However, for the high tensile, high elongation materials of this invention, slippage inside the grips was a problem even with self-tightening grips lined with high friction sand paper.

The ASTM D412-92 test procedure bench marks a 1 inch (25.4 millimeter) distance (Lo) in the middle of the dumbbell shaped or straight specimen and observes the elongated distance (L) between the bench marks at time of break. The percent elongation at break (E) is calculated as 100×(L−Lo)/Lo. In this method, the elongation away from the baseline can be tracked on the digital display of the tensile test machine and when the specimen breaks and the machine stops, the actual travel distance can be taken and used for purposes of calculation. Still, slippage inside the grip gave artificially high elongations at break.

Finally, a modified procedure was also tested. In this modified procedure, the starting grip distance (distance between the grips) was set at 1 inch (25.4 millimeters). Dumbbell shaped specimens are preferred for use with samples having a thickness over 0.020 inches (0.508 millimeters) and straight specimens were preferred for samples having thickness of about 0.006 (0.1524 millimeters) to about 0.020 inches (0.508 millimeters). The choice of which geometry to use was generally decided depending upon whether the material could be broken within the thickness range using a particular configuration. The preferred specimen length was 3⅜ inches (85.725 millimeters) long. Bench marks of 1 inch (25.4 centimeter) were marked on the center locations of the specimens. Each grip overlapped the positions of the bench marks. As the specimens were stretched, and as suspected, the initial bench marks were stretched out of the grip. The distance between the bench marks were tracked using the tensile test machine's digital display of "deflection" distance. At the same time, the distance between the elongated marks at the moment of tensile break was measured. For high elongation materials, the gap distance is to be monitored and measured accurately during tensile testing, as both sides of the bench marks are traveling and expanding at the same time.

To determine the precise elongation, two persons are required, with one person holding a vertical ruler to track the location of the bottom bench mark line, while the other tracks the reading of the upper bench mark line on the ruler. The observed elongated distance at break (L) was used to calculate the percent elongation at break for the purpose of this invention as used in ASTM D412-92.

For comparison, the deflection on the tensile tester was set to zero deflection at 1 inch (25.4 millimeters) grip separation, and the digital display of grip travel distance away from the initial 1 inch (25.4 millimeters) distance was measured when the specimen broke. The distance was divided by 1 inch (Lo) to calculate the percent elongation at break (slippage) for comparison. Since the digital deflection value is L−Lo, this is mathematically the same as 100(L−Lo)/Lo. The results indicate that even with self-tightening grips, the slippage inside the grips caused artificially high elongation at break of up to 2486% (machine limit), while the elongation at break as defined by the test method of this invention is substantially lower. These results indicate that ASTM D882 is not a good test procedure for high strength, high elongation elastic materials.

The elastic recovery after tensile stretch is a useful property for ascertaining the erosion resistance of coatings. There is no reference to this property in the ASTM D882 test method. For purposes of calculating the tensile set at break, ASTM D412-92 defines the tensile set (E) as E=100 (L−Lo)/Lo, wherein L is the distance between the bench marks after a 10 minute retraction period, while Lo is the initial distance between the benchmarks. The criteria prescribed by ASTM D412-92 are not sufficient to determine good erosion resistant materials because in reality the raindrops can impact the erosion resistant coating at intervals of less than or equal to about 2 minutes. A good measure to determine whether a material is suitable for erosion protection is therefore to measure the tensile set immediately after tensile break as soon as possible. As noted above, two lines with a separation distance of 1 inch (2.54 millimeter) are marked on the test specimens and used for the elongation at break test. After the test specimens break on the test stand, they were taken down and were reassembled. The distance between the line marks were measured and used to calculate the Tensile Set at Break (Recovery). The time to take the measurements is about 30 to 60 seconds after the specimen breaks. For the purpose of this invention, the Tensile Set Recovery is defined as the (L−Lo)/Lo, in which the L is distance of the lines measured after tensile break within 30 seconds to one minute and Lo is the original distance of 1 inch (25.4 millimeters).

To determine the Shore A hardness of the materials, ASTM D2240 procedure was used. A PTC 306L Type A Durometer with 471 1 kilogram Deadweight Test Stand was used. The test readings include the readings upon first contact and the readings after 15 seconds (i.e., Example 1, expressed as "82 to 64 A" indicating an initial value of 82 A and value taken 15 seconds later of 64 A). For a highly elastomeric material ("live rubber"), the initial Shore A reading is the same as it is after a period of time with the durometer held in firm contact with the specimen surface. If the specimen is quite plastic, a more rapid receding to a substantially lower hardness reading is observed with the passage of time. The receding of the hardness is also called "Creep".

For thin coating samples, multiple layers of the coatings were stacked up to a thickness of greater than or equal to about 0.120 inches (3.04 millimeters) for measurement. The hardness of the polyurethane elastomers varies with temperature, and the hardness generally increases with a decrease in temperature. The hardness tests were performed at a temperature of about 68 to about 82° F. While Shore A hardness of the softer materials seemed to vary with the 14° F. difference, the range of effective Shore A hardness as defined later is functional.

As detailed below, the following tests were conducted on the erosion resistant coatings. Desirable properties and characteristics are listed below.

Tensile strength: In order to resist the cutting and tearing from the impact of the raindrops or sand particles at high speed, the material must have sufficient tensile strength. The tensile strength requirements for the erosion resistant coatings is about 70 kg/cm² to about 210 kg/cm² for polyurethanes. It is generally desirable for the erosion resistant coating to have a minimum tensile strength of 70 kg/cm², preferably greater than or equal to about 140 kg/cm².

Percent elongation at break: Considering that the typical aircraft substrates are very rigid and have percent elongation at break of less than 100% and that the erosion resistant coatings are applied at a thickness of about 0.014 inches (0.3556 millimeter), it is quite difficult to imagine that a highly erosion resistant material needs to have very high percent elongation at break. Commercially available materials generally show that the minimum of percent elongation at break is about 300 to about 350% and their product datasheets disclose that the typical values of percent elongation at break are about 500% for glossy coatings and about 300% for lusterless sprayable coatings. The prior art materials of the lusterless coatings did not exceed 300% in elongation. It has been discovered that that the elongation at break values of a highly erosion resistant sprayable low luster coating is greater than or equal to about 400%, preferably greater than or equal to about 425%, more preferably greater than or equal to about 500%, and most preferably greater than or equal to about 550%.

Tensile set recovery: A material having very high percent elongation (e.g., greater than or equal to about 400%) is not always a good erosion resistant material. When a material is highly stretchable with very high elongation, it may stay stretched with poor recovery after tensile break. It has discovered that in order to resist the rain erosion, the material should display a tensile set at break of less than 150%, more preferably less than 73% and most preferably less than 60% in addition to a high elongation at break of greater than or equal to about 350%. The value of this property is generally due to the nature of rain erosion. Raindrops impact the substrate in an intermittent pattern. In general, no particular location on a surface is continuously impacted by rain drops. Instead, the raindrops impact the surface in an irregular, intermittent manner, at varying short intervals. After having resisted the cutting and tearing of the rain drops because of its high elongation to break, the material should be able to recover very quickly in order to face another wave of impact damage from the raindrops. It is therefore desirable for the material to have a high tensile strength, a high elongation, as well as recover sufficiently from tensile stretch in order to provide suitable protection against rain erosion.

Shore A Hardness: The importance of Shore A hardness in a good erosion resistant material is its ability to absorb impact energy and to bend under impact. It has been discovered that polyurethane materials stiffen substantially with decrease in temperature. It is desirable for the Shore A values at 68° F. to be less than or equal to about 95 A. The most preferred Shore A range is about 44 to about 93 A.

Rain Erosion Test Condition 1: The specimens were also tested at the Air Force Research Lab Rain Erosion Test Facility, Wright-Patterson Air Force Base, Dayton, Ohio. Predominant rain drop size rate is about 1.8 to about 2.2 millimeters diameter. The rainfall rate is set at one inch per hour. The erosion resistance of a coating can be judged by combining the information of total rain erosion test time and the degree of erosion on the specimens. The failure of the coating is usually the time when the erosion reaches the substrate.

In the following examples, aluminum airfoil substrates were used. A water reducible epoxy primer Deft 44GN063 was used except where it is noted. The aluminum airfoil was blasted with 100 grit aluminum oxide, detergent cleaned and water rinsed, dried, and Alodine 1200S treated. The airfoil was then primed coated with one coat of 44GN063. The primed airfoils may be heated at 50° C. for 20 minutes to speed up the drying and curing, or left at room temperature, typically for 1 to 2 hours before applying the top coat layer with the polyurethane coating compositions.

The base coat layer is used to build up the thickness, with the top coat layer having the matte surface finish applied in one or two coats.

The following ingredients used in the formulations are shown in Table 1:

TABLE 1

| Ingredient | Details |
| --- | --- |
| Prepolymers | Varies according to example. |
| Disperbyk 166 | dispersant from BYK-Chemie. |
| Stan-Tone White HCC-19590 | 60% TiO2 in plasticizer, from Poly-One. |

TABLE 1-continued

| Ingredient | Details |
| --- | --- |
| Stan-Tone Black HCC-7198 | 20% carbon black in plasticier, from Poly-One. |
| Gray color concentrate HT92-158A | (HCC-19590 white/HCC-7198 black at 75/5 weight ratio) |
| Gray color concentrate P94-131-1A | (water based gray color concentrate 92.39% UCD-1106E white/7.61% UCD-1507E black) |
| Defoamer concentrate: Byk 051 | used as 2% in solvent (toluene or butyl acetate) |
| Wetting agent concentrate: Silwet L7602 | Silwet L7602, used as 2% in solvent (toluene or butyl acetate) |
| UV stabilizer UV92-243-1 | 39.49% solid content of 2/2/1 by weight mixture of Tinuvin 123/Tinuvin 328/Irgonox 1135 in solvent (toluene or butyl acetate) |
| Hydrolysis stabilizer | Staboxol P200, 50% in toluene |
| Flatting agent concentrate #1 | 5.97% Acematt TS-100 dispersed with 2.95% Disperbyk 103 in solvent. Solvent may be n-propyl acetate, n-butyl acetate, PM acetate, MAK, MIBK, toluene or mixtures of the above. Moisture reduced to below 0.04% by treating with molecular sieves. |

Example 1

This example demonstrates the use of TDI-ester with polyaspartic ester of this invention. An aluminum airfoil primed with a water based epoxy primer was coated with eight coats of a glossy gray coating composition to form a base coat (#1B) layer comprising a TDI-ester prepolymer and a polyaspartic ester curative. After drying for about one hour at room temperature, one coat of a matte coating was sprayed over the glossy base coat. The matte top coat layer (#1T) was a polyurethane coating comprising a toluene diisocyanate-polytetramethylene glycol (TDI-PTMEG) prepolymer and an aldimine curative. The dry protective coating thickness at the leading edge measured about 0.018 inches. The coating was cured at ambient temperature and humidity. The dried airfoil had a 85 degree gloss of 5.8.

The coated airfoil was subjected to Rain Erosion Test Condition 1. After 155 minutes, the specimen show minor pitting and cratering, with only one site eroded all the way to the substrate.

The Gloss Basecoat #1B was prepared as follows: A gray pigmented concentrate of a TDI-ester prepolymer, Versathane D-5QM, with an isocyanate content of 4.99%, available from Air Products Chemicals was prepared by mixing the following ingredients in a mechanical mixer with a high shear mixing blade until uniformly dispersed. The ingredients are shown in Table 2.

TABLE 2

| Basic ratio | Actual weight |
| --- | --- |
| 25 | 1309 g of Versathane D-5QM |
| 6.25 | 327.4 g of Solvent blend (toluene/MIBK/xylene, at 1/1/2 ratio by weight) |
| 1.00 | 52.36 g of Disperbyk 166, available from BKY-Chemie. Used as 5% concentrate in toluene. |
| 1.55 | 81.78 g of gray pigment conctrate (HCC-19590 white/HCC-7198 black at 75/5 weight ratio) |
| 0.60 | 31.41 g of wetting agent concentrate |
| 0.30 | 15.77 g of defoamer concentrate |

*g = grams

The final coating composition was prepared by mixing the following ingredients together: 70.0 g of the above gray prepolymer concentrate, 2.64 g of UV92-243-1, 2.12 g of hydrolysis stabilizer, 47.68 g of flatting agent concentrate (in a mixture of toluene/xylene/PMAcetate//n-propyl acetate/n-butyl acetate/MAK, ratio not critical), 19.91 g of polyaspartic ester Desmophen NH1420 (used as 80% mixture in xylene), 8.10 g of 2% organic acid (Industrene 206) in toluene, 31.0 g of MAK (methyl n-amyl ketone). The above ingredients were mixed with a high shear mixer blade in a plastic container until fully dispersed. The solution has a Brookfield viscosity of 96 cps.

The solution sprayed and flowed very well using a small conventional spray gun. A spray dried film of the composition has a 60 degree/85 degree gloss of 38/55. When the solution was draw-down on a releasable plastic plate, and subject to drying at 20° C. for 16 hours and then 30° C. for 2 days. When a 0.006 inch (0.152 millimeter) thick specimen was tested later under the modified tensile test procedure detailed above, using 1 inch as the distance of jaw separation, the coating had a tensile strength of 7233 psi, 525% elongation at break, 26% tensile set recovery and a shore A hardness of 82-62 A at 68° F. (82 A was the hardness upon first contact and 62 A was the hardness after 15 minutes). If slippage in the tensile specimen holder is allowed into the calculation, the elongation at break was 1237%.

The Matte Topcoat #1T was prepared as follows: An 80% by weight prepolymer solution was prepared by mixing an equal part of TDI-PTMEG prepolymer (Airthane PET-85A, NCO=3.33%) to another equal part of a TDI-PTMEG prepolymer (Airthane PET-93A, NCO=5.24%) in a solvent mixture of 1/1/1 by weight n-Propyl acetate/n-Butyl acetate/ PMAcetate.

A gray pigmented prepolymer solution was prepared by mixing the following ingredients with a high shear mixing blade till uniformly dispersed.

1479.69 g of the above 80% prepolymer solution, 47.35 g of 5% Disperbyk 166 in toluene and 73.39 g of gray pigment concentrate HT92-158A The final matte topcoat solution was mixed with a high shear mixing blade according to the following ratio:

51.60 g of the above gray prepolymer solution,
1.38 g of UV stabilizer UV92-243-2,
76.38 g of flatting agent concentrate (in a mixture of toluene/xylene/PMAcetate//n-propyl acetate/n-butyl acetate/ MAK). Moisture controlled to below 0.04% with molecular sieve, ground by a high shear homogenizer Diax 600.
5.10 g of Aldimine Desmophen PAC XP7076
3.00 g of 2% organic acid (Industrene 206) in toluene
0.47 g of defoamer concentrate
32.00 g of 1/1/2 n-Propyl acetate/n-butyl acetate/PMAcetate The solution had a viscosity of 80 cps. When sprayed onto a substrate, the dried coating had a 60 degree/85 degree surface gloss of 2.3/3.9. A 0.009 inch thick sheet of the cured coating had a tensile strength of 6000 psi, an elongation at break of 575%, a tensile set recovery of 22%. The elastomer had a Shore A hardness of 82-71 A at 68° F. If slippage in the tensile specimen holder is allowed in the calculation, the elongation at break was 1679%.

Example 2

This example demonstrates the use of TDI-ether with polyaspartic esters-aldimine curing agent mixture of this invention:

In a procedure similar to Example 1 above, three coats of glossy urethane basecoat (#2B1), five coats of gloss urethane basecoat (#2B2) and one coat of matte urethane topcoat (#2T) were sprayed on an epoxy primed aluminum airfoil. The dry coating thickness at the leading edge measured about 0.020 inches. The matte topcoat by itself had an 85 degree gloss of 3.5. The dried airfoil had an 85 degree gloss of 3.5. The coated airfoil was subjected to Rain Erosion Test Condition 1. After 160 minutes, two craters were formed, one of which extended to the substrate. A few tiny pits were noticed. The topcoat adhesion was adjudged to be excellent.

The gloss gray basecoats were based on a TDI-PTMEG prepolymer and aldimine/aspartic ester curative mixture at 1/2 molar ratio. The matte topcoat was based on TDI-PTMEG prepolymer and aldimine curative.

The Gloss Basecoat #2B1 with 2% by weight of flatting agent was prepared as follows: A gray pigmented concentrate of a TDI-PTMEG prepolymer, AIRTHANE PET-93A, with an isocyanate content of 5.23%, available from Air Products and Chemicals was prepared by mixing the following ingredients in a mechanical mixer with a high shear mixing blade. The ingredients are shown in Table 3 below:

TABLE 3

| Basic Ratio | Actual Weight |
| --- | --- |
| 31.25 | 1600 g of 80% Airthane PET-93A in 1/1/1 n-Propyl acetate/n-butyl acetate/PMAcetate |
| 1.00 | 51.26 g of 5% Disperbyk 166 in toluene |
| 1.55 | 79.70 g of Gray color concentrate HT92-158A |
| 0.60 | 30.72 g of wetting agent concentrate |

The final solution was prepared by mixing the following ingredients with high shear mixing blade till uniformly dispersed.

86.0 g of the above gray prepolymer concentrate
2.50 g of UV92-243-2
28.70 g of flatting agent concentrate (in a mixture of toluene/xylene/PMAcetate//n-propyl acetate/n-butyl acetate/MAK. Diax 600 homogenizer ground for 3 minutes),
21.80 g of a curing agent concentrate, made of 15.93% by weight of Aldimine Desmophen PAC XP7076, 64.07% by weight of Polyaspartic ester Desmophen NH1402 and 20% of xylene. The molar ratio of XP7076/NH1402 is 1/2.
5.0 g of 2% organic acid (Industrene 206) in toluene, 10 g of MAK 42 g of PMAcetate.
0.75 g of defoamer concentrate.

The above ingredients were mixed with a high shear mixer blade in a plastic container until fully dispersed. The solution has a viscosity of 108 cps.

Another Gloss Basecoat #2B2 was prepared with flatting agent at 4% of the resin solid as follows:

86.0 g of the above gray prepolymer concentrate
2.50 g of UV92-243-2
57.4 g of flatting agent concentrate (in a mixture of toluene/xylene/PMAcetate//n-propyl acetate/n-butyl acetate/MAK. Diax 600 homogenizer ground for 3 minutes),
21.72 g of a curing agent concentrate, (15.93% by weight of Aldimine Desmophen PAC XP7076, 64.07% by weight of Polyaspartic ester Desmophen NH1402 and 20% of xylene). The molar ratio of XP7076/NH1402 is 1/2.
26 g of 1/1/2 n-Propyl acetate/n-butyl acetate/PMAcetate.
0.75 g of defoamer concentrate.

The solution had a viscosity of 118 cps. After curing, a 0.008" thick gloss basecoat #2B2 had a tensile strength of 3775 psi, an elongation at break of 525%, and a tensile set recovery of 10.2%. The elastomer had a Shore A hardness of 67 to 53 A at 68° F. When measured with slippage in jaw at 1", the elongation at break was 1320%.

The Matte Topcoat #2T

The composition of matte topcoat #2T is similar to that of matte topcoat #1 except that slightly lower amount of flatting agent was used and the mixing was done with high shear dispersion blade without the use of a homogenizer Diax 600. The formulation was as follows:

51.6 g of the gray prepolymer solution
1.35 g of UV stabilizer UV92-243-2
72.5 g of flatting agent concentrate (in a mixture of toluene/xylene/PMAcetate//n-propyl acetate/n-butyl acetate/MAK. Moisture controlled to below 0.04% with molecular sieve)
5.10 g of Aldimine Desmophen PAC XP7076
3.00 g of 2% organic acid (Industrene 206) in toluene
20.00 g of 1/1/2 n-Propyl acetate/n-butyl acetate/PMAcetate The coating has a viscosity of 112 cps. The cured matte coating at 0.014" thick, had a tensile strength of 5914 psi, an elongation at break of 525% and a tensile set recovery of 18%. When measured with slippage in jaw at 1", the elongation at break was 1613%. The matte elastomer had a Shore A hardness of 82-73 A at 68° F.

Example 3

This example demonstrates the use of TDI-ester-aspartic ester basecoat with H12MDI PTMEG-aldimine-aspartic ester matte topcoat. In a procedure similar to Example above, eight coats of Gloss Basecoat #3B and one coat of Matte Topcoat #3T were sprayed on an epoxy primed aluminum airfoil. The dry coating thickness at the leading edge measured about 0.019 inches. The dried airfoil had a 60 degree/85 degree gloss of 1.8/3.8. The coated airfoil was subjected to Rain Erosion Test Condition 1 for 140 minutes with moderate damage. Excellent topcoat adhesion was observed.

The gloss gray basecoat #3B was based on a TDI-ester prepolymer and aldimine curative. The matte topcoat was based on H12MDI-PTMEG prepolymer and aldimine-polyaspartic ester mixture curatives. The Gloss Basecoat #3B was prepared as follows:

A gray pigmented concentrated of an TDI-terminated polyester prepolymer, VERSATHANE A-9QM, with isocyanate content of 4.28%, available from Air Products and Chemicals was prepared by mixing the following ingredients in a mechanical mixer with a high shear mixing blade. The ingredients are shown in Table 4.

TABLE 4

| Basic Ratio | Actual Weight |
| --- | --- |
| 31.25 | 1600 g of Versathane A-9QM, 80% in toluene/MIBK/xylene (1/1/2 ratio by weight) |
| 1.00 | 51.20 g of 5% Disperbyk 166 in toluene |
| 1.55 | 79.36 g of gray pigment conctrate HT92-158A |
| 0.60 | 30.72 g of wetting agent concentrate |
| 0.30 | 15.36 g of defoamer concentrate |

The final coating solution was prepared as in the following ratio:
- 86.75 g of the above gray prepolymer concentrate,
- 2.85 g of UV92-243-1,
- 2.30 g of hydrolysis stabilizer,
- 50.98 g of flatting agent concentrate (5.97% TS-100 in a mixture of toluene/xylene/PMAcetate//n-propyl acetate/n-butyl acetate/MAK),
- 8.50 g of aldimine Desmophen PAC XP7076,
- 4.4 g of 2% organic acid in toluene, (Industrene 206),
- 20.0 g of MAK.

The above ingredients were mixed with a high shear mixer blade in a plastic container until fully dispersed. The solution has a viscosity of 100 cps. The cured gloss basecoat #3B, at 0.012" thickness, showed a tensile strength of 6500 psi, an elongation at break of 675% and a tensile set recovery of 30%. When the slippage in the jaw was ignored, the elongation at break was 1845%. The gloss basecoat had a Shore A hardness of 78-70 A at 68° F.

The Matte Topcoat #3T was prepared as follows:

A gray pigmented concentrate of an H12MDI-PTMEG prepolymer, ADIPRENE LW520, with isocyanate content of 4.81%, available from Uniroyal Chemical was prepared by mixing the following ingredients in a mechanical mixer with a high shear mixing blade. The ratios are shown in Table 5 below.

TABLE 5

| Basic Ratio | Actual Weight |
|---|---|
| 31.25 | 2532.0 g of Adiprene LW520, NCO = 4.81%, 80% in n-propyl acetate/n-butyl acetate/PMAcetate (1/1/1 by weight) |
| 1.00 | 81.08 g of 5% Disperbyk 166, in toluene |
| 1.55 | 125.60 g of gray pigment concentrate HT92-158A |
| 0.60 | 48.61 g of wetting agent concentrate |
| 0.30 | 48.70 g of defoamer concentrate |

The final matte coating solution was prepared as in the following ratio:
- 52.50 g of the above gray prepolymer concentrate,
- 1.47 g of UV92-243-2,
- 1.14 g of aldimine Desmophen PAC XP7076,
- 7.63 g of polyaspartic ester Desmophene NH1220
- 82.50 g of flatting agent concentrate (5.97% TS-100 in a mixture of n-propyl acetate/n-butyl acetate/PMAcetate (1/1/2),
- 3.00 g of 2% organic acid in toluene, (Industrene 206),
- 15.0 g of PMAcetate The matte coating solution has a viscosity of 115 cps. When sprayed one coat over a substrate, the 60/85 degree gloss was 2.0/3.3. After curing, a 0.008" thick sheet of the matte coating showed a tensile strength of 5575 psi, an elongation at break of 525%, and a tensile set recovery of 18%. When the slippage in the jaws (grips) was ignored, the elongation at break was 1470%. The cured matte topcoat had a Shore A hardness of 81-72 A at 68° F.

Example 4

This example demonstrates the use of regular aromatic diamine with the aldimine with TDI-ester prepolymer.

The Gloss Basecoat #4B was prepared as follows: A black pigmented concentrate of an TDI-ester prepolymer, VERSATHANE A-85QM, with isocyanate content of 3.61%, available from Air Products and Chemicals was prepared by mixing the following ingredients in a mechanical mixer with a high shear mixing blade. The ratios are shown in Table 6.

TABLE 6

| Basic Ratio | Actual Weight |
|---|---|
| 31.25 | 1254 g of Versathane A-85QM, 80% in toluene/MIBK/xylene (1/1/2 ratio by weight) |
| 1.58 | 63.40 g of HCC-7198 black pigment concentrate |
| 0.60 | 24.08 g of wetting agent concentrate |
| 0.30 | 24.16 g of defoamer concentrate |

The final coating solution was prepared as in the following ratio:
- 68.06 g of the above black prepolymer concentrate,
- 1.76 g of hydrolysis stabilizer,
- 4.0 g of 2% organic acid in toluene, (Industrene 206),
- 34.0 g of PMAcetate
- 10.42 g of aldimine/amine concentrate made of 41.26% of aldimine Desmophen PAC XP7076, 8.74% Ethacure 100, 50.0% Toluene. All ratio by weight. Mixture is aldimine/aromatic amine at 3/1 molar ratio, The above ingredients were mixed with a high shear mixer blade in a plastic container until fully dispersed. The solution has a viscosity of 113 cps. The cured gloss basecoat #4B, at 0.012" thickness, showed a tensile strength of 3567 psi, an elongation at break of 725% and a tensile set recovery of 18%. When the slippage in the jaw was ignored, the elongation at break was 1969%. The gloss basecoat had a Shore A hardness of 52 to 45 A at 68° F.

The Matte Topcoat #3T was prepared as follows:

The final coating solution was prepared as in the following ratio:
- 34.03 g of the above black prepolymer concentrate,
- 0.88 g of hydrolysis stabilizer,
- 2.0 g of 2% organic acid in toluene, (Industrene 206),
- 42.40 g of flatting agent concentrate (5.97% TS-100, 2.95% Disperbyk 103 in a mixture of ½ toluene//MAK. Moisture reduced to 0.02% with molecular sieve),
- 5.21 g of aldimine/amine concentrate made of 41.26% of aldimine Desmophen PAC XP7076, 8.74% Ethacure 100, 50.0% Toluene. All ratios are by weight. Mixture is aldimine/aromatic amine at 3/1 molar ratio, The matte coating solution has a viscosity of 52 cps. When sprayed one coat over a substrate, the 60/85 gloss was 1.0/3.1. After curing, a 0.017" thick sheet of the matte coating showed a tensile strength of 5282 psi, an elongation at break of 800%, and a tensile set recovery of 46%. When the slippage in the jaw was ignored, the elongation at break was 2337%. The cured matte topcoat had a Shore A hardness of 81 to 67 A at 68° F.

Eight coats of the gloss basecoat and one coat of the matte topcoat were sprayed onto an epoxy primed aluminum airfoil. The dry film thickness at the leading edge was 0.011 inch. The dried airfoil had a 60/85 degree gloss of 0.9/3.5. It was subjected to rain erosion test condition 1. After 115 minutes, there was moderate damage with damage at three sites extending to the substrate.

Example 5

This example demonstrates the use of water based coating with solvent based coating of this invention, and the protective effect of high elongation matte topcoat on low elongation gloss basecoat.

Eight coats of water-based gloss urethane basecoat #5B, one coat of solvent based matte urethane topcoat #5T1 and another coat of solvent based matte urethane topcoat #5T2 were sprayed on an epoxy primed aluminum airfoil. The dry coating thickness at the leading edge measured about 0.021 inches. The dried airfoil had a 60/85 degree gloss of 1.2/2.2. The coated airfoil was subjected to Rain Erosion Test Condition 1. After 113 minutes, only three craters and a few pits @113 min. Not failed yet.

The gloss gray basecoat was a blend of water dispersion of polyurethane polymers with additional epoxy crosslinking agent. The matte topcoats were a solvent based urethane coating based on TDI-PTMEG prepolymer and aldimine. This example describe that, when more than one coatings are used, at least one of the coatings is preferably over 425% elongation.

Gloss Basecoat #5B 5 parts of a water bases aliphatic-ether polyurethane dispersion HD-2024, available from Hauthaway, was mixed with 1 part of aliphatic polyurethane dispersion UNITHANE RI. The resulting coating had 43.3% solid.

The gloss basecoat was prepared by mixing the following together:
- 302.35 g of the above water based polyurethane dispersion
- 10.50 g of Gray color concentrate P94-131-1A
- 7.02 g of HA806 (water dispersible epoxy curing resin from Hauthaway)
- 4.22 g of UV92-243-10 (2/2/1/5 by weight mixture of Tinuvin 213/Tinuvin 292/Irganox 1135/n-methylpyrrolidone)
- 11.0 g of distilled water
- 10 drops of defoamer (Dapro DF2162)

The coating had a Brookfield viscosity of 50 cps. After drying and curing, the coating had an average tensile strength of 2077 psi, an elongation at break of 380%, and a tensile set recovery of 15%. The gloss basecoat had a Shore A hardness of 80 to 60 A at 68° F.).

The Matte Topcoat #5T1 was prepared as follows:

A gray pigmented prepolymer solution was prepared by mixing the following ingredients with a high shear mixing blade till uniformly dispersed.
- 463.14 g of an 80% prepolymer solution (Airthane PET-85A, NCO=3.33%) in 1/1/1 n-propyl acetate/n-butyl acetate/PMAcetate,
- 470.0 g of an 80% prepolymer solution (Airthane PET-93A, NCO=5.23%) in 1/1/1 n-propyl acetate/n-butyl acetate/PMAcetate,
- 29.93 g of 5% Disperbyk 166 in toluene
- 46.50 g of gray pigment concentrate HT92-158A
- 29.84 g of wetting agent concentrate
- 17.90 g of defoamer concentrate The final matte topcoat solution #5T1 was mixed with a high shear mixing blade according to the following ratio:
- 35.40 g of the above gray prepolymer solution
- 3.42 g of Aldimine Desmophen PAC XP7076
- 2.00 g of 2% organic acid (Industrene 206) in toluene
- 47.66 g of flatting agent concentrate (in a 1/1/2 by weight mixture of/n-propyl acetate/n-butyl acetate/PMAcetate. No moisture scavenger used.))
- 24.00 g of 1/1/2 n-Propyl acetate/n-butyl acetate/PMAcetate The solution has a viscosity of 133 cps. When sprayed onto a substrate, the dried coating had a 60/85 degree surface gloss of 1.9/3.0.

A 0.013" thick sheet of the cured coating had a tensile strength of 4852 psi, an elongation at break of 600%, a tensile set recovery of 22%. The elastomer had a hardness of 74-56 A at 68° F. If slippage in the tensile specimen holder is ignored, the elongation at break was 1720%.

Another matte topcoat #5T2 was prepared the same way as #5T1, except that 20.0 grams of 1/1/2 n-Propyl acetate/n-butyl acetate/PMAcetate was used. The flatting agent concentrate was treated with moisture scavenger to reduce the moisture content to 0.029%. The sprayed dried #5T2 coating had a 60/85 degree surface gloss of 1.1/2.1.

A 0.015" thick sheet of the cured coating had a tensile strength of 4600 psi, an elongation at break of 600%, a tensile set recovery of 22%. The elastomer had a hardness of 83-68 A at 68° F. If slippage in the tensile specimen holder is ignored, the elongation at break was 1754%.

Example 6

This example demonstrates the use of water based basecoat and, matte topcoat and the significance of combined tensile properties disclosed in this invention to the erosion resistance of the elastomer.

23 coats of water based urethane gloss basecoat and one coat of water based matte urethane topcoat were sprayed on an epoxy primed aluminum airfoil. The dry coating thickness at the leading edge measured about 0.027 inches. The dried airfoil had an 85 degree gloss of 3.0. The coated airfoil was subjected to Rain Erosion Test Condition 1. After 135 minutes, only crater and one tiny surface pit after 135 min. Not to substrate yet.

The gloss gray basecoat was a water dispersion of polyurethane polymer without additional crosslinking agent. The matte topcoat was the same composition with additional matting agent added.

Gloss Basecoat #6B:

The gloss basecoat #6B was prepared by mixing the following ingredients with high shear mixing blade till uniformly dispersed.
- 665.94 g of HD-2024 water based aliphatic polyether polyurethane dispersion, available from Hauthaway,
- 24.02 g of gray concentrate HT86-237G
- 79.50 g of distilled water
- 3.0 g of 5% Silwet L7602 wetting agent
- 30 drops of defoamer DF2162

The coating had a Brookfield viscosity of 130 cps. A 0.030" thick dry gloss basecoat showed a tensile strength of 2010 psi, an elongation at break of 675%, a tensile set recovery of 46%. If slippage in the tensile specimen holder is ignored, the elongation at break was 1425%. The elastomer had a hardness of 58-42 A at 68° F.

The matte topcoat #6T was prepared by mixing the following ingredients with high shear mixing blade till uniformly dispersed.
- 332.99 g of HD-2024 water based aliphatic polyether polyurethane dispersion, available from Hauthaway,
- 12.05 g of gray concentrate HT86-237G
- 163.22 g of distilled water
- 29.89 g of Lo-Vel 2000 silica flatting agent
- 1.52 g of 5% Silwet L7602 wetting agent
- 15 drops of defoamer DF2162

The coating had a Brookfield viscosity of 167 cps. A 0.036" thick dry matte basecoat showed a tensile strength of 2778 psi, an elongation at break of 650%, a tensile set recovery of 73%. If slippage in the tensile specimen holder is ignored, the elongation at break was 1383%. The elastomer had a hardness of 86-81 A at 70° F.

Comparative Example 1

Caapcoat FP-250

Caapcoat FP-200, a glossy sprayable polyurethane coating based on isocyanate terminated polyester prepolymer and an aliphatic amine, The coating as mixed had a viscosity of 215 centipoises and was thinned with a 1/1/2 mixture of toluene/MIBK/xylene to a viscosity of 149 cps. Twenty-five coats of FP-200 was sprayed on an aluminum airfoil primed with Aeroglaze 9947. After waiting for two hours to allow the basecoat to dry to prevent mud cracking of the topcoat, the lusterless topcoat FP-050 was sprayed over the gloss basecoat. The dried coating thickness was about 0.020". The airfoil had a 85o gloss of 2.5. The cured airfoil was subjected to Rain Erosion Test Condition 1. The specimen showed widespread erosion to the substrate at 36 minutes and was stopped at 41 minutes.

The gloss basecoat FP-200 showed an average tensile strength of 4604 psi, an average elongation at break of 425%, a tensile set recovery of 10%. The elastomer has a Share A hardness of 77-68B at 70 F.

The matte topcoat FP-050 showed a an average tensile strength of 5148 psi, an elongation at break of 362%, a tensile set of 22%, and Shore A hardness of 84-78 A.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A polyurethane or polyurea rain erosion resistant coating composition for protecting a leading edge substrate on an airfoil against liquid and solid particle erosion, comprising:
   an isocyanate-terminated prepolymer with an isocyanate content of about 0.5 to about 40 weight percent, based on the weight of the prepolymer;
   a curing agent selected from the group consisting of an aldimine, a ketimine, a polyaspartic ester, a polyamine, a polyol and mixtures thereof; and
   a flatting agent, having a particle size of about 1 to about 20 micrometers present at a level of about 1 to about 15 weight percent based on the total weight of the said polyurethane or polyurea coating composition, and selected from the group consisting of silica, polymeric beads, talc, alumina, calcium carbonate, urea-formaldehydes and mixtures thereof;
   said polyurethane or polyurea rain erosion resistant coating composition in dry cured form having a tensile strength greater than 1000 psi (70 kg/cm$^2$), an elongation at break greater than 350%, a tensile set after break of less than 150%, and a Shore A hardness of 44A to 95A as measured at 68° F., a matte finish as measured according to ASTM D 523-89 (1999) with an 85 degree surface gloss less than 15, and having a rain erosion resistance of greater than or equal to 70 minutes.

2. The coating composition of claim 1, wherein the prepolymers have an isocyanate content of 1.0 to about 20 weight percent, based on the weight of the prepolymer after reaction.

3. The coating composition of claim 1, wherein the prepolymer is prepared using starting materials at an NCO/OH equivalent ratio of about 1.05:1 to about 10:1.

4. The coating composition of claim 1, wherein the prepolymer has free isocyanate monomer of less than 0.1%.

5. The coating composition of claim 1, wherein the isocyanate-terminated prepolymers are selected from the group consisting of TDI-ether, TDI-ester, TDI-lactone, MDI-ether, MDI-ester, H$_{12}$MDI-ether, H$_{12}$MDI-ester and prepolymers made from diisocyanates selected from the group consisting of HDI, IPDI, and PPDI.

6. The coating composition of claim 1, wherein the isocyanate-terminated prepolymer is made from diisocyanates selected from the group consisting of 2,4-toluene diisocyanate and 2,6-toluene diisocyanate (TDI); mixtures of the two TDI isomers; 4,4'-diisocyanatodiphenylmethane (MDI); p-phenylene diisocyanate (PPDI); diphenyl-4,4'-diisocyanate; dibenzyl-4,4'-diisocyanate; stilbene-4,4'-diisocyanate; benzophenone-4,4'-diisocyanate; 1,3- and 1,4-xylene diisocyanates and mixtures thereof.

7. The coating composition of claim 1, wherein the isocyanate-terminated prepolymer is made from diisocyanates selected from the group consisting of 1,6-hexamethylene diisocyanate (HDI); 1,3-cyclohexyl diisocyanate; 1,4-cyclohexyl diisocyanate (CHDI); the saturated diphenylmethane diisocyanate H(12)MDI; bis{4-isocyanatocyclohexyl}methane, 4,4'-methylene dicyclohexyl diisocyanate, 4,4-methylene bis (dicyclohexyl)diisocyanate, methylene dicyclohexyl diisocyanate, methylene bis (4-cyclohexylene isocyanate), saturated methylene diphenyl diisocyanate, and saturated methyl diphenyl diisocyanate), isophorone diisocyanate (IPDI); hexamethylene diisocyanate (HDI), 2,2,4- and/or 2,4,4-trimethyl-1,6-hexamethylene diisocyanate, dodecamethylene diisocyanate, 1,4-diisocyanatocyclohexane, 1-isocyanato-3,3,5-trimethyl-5-isocyanatomethylcyclohexane (IPDI), 2,4'- and/or 4,4'-diisocyanato-dicyclohexyl methane, 2,4- and/or 4,4'-diisocyanato-diphenyl methane and mixtures of these isomers with their higher homologues which are obtained by the phosgenation of aniline/formaldehyde condensates, 2,4- and/or 2,6-diisocyanatotoluene and mixtures of these compounds.

8. The coating composition of claim 1, wherein the isocyanate-terminated prepolymer is made from diisocyanates selected from the group consisting of hexamethylene diisocyanate (HDI), 2,2,4- and/or 2,4,4-trimethyl-1,6-hexamethylene diisocyanate, dodecamethylene diisocyanate, 1,4-diisocyanatocyclohexane, 1-isocyanato-3,3,5-trimethyl-5-isocyanatomethylcyclohexane (IPDI), 2,4'- and/or 4,4'-diisocyanato-dicyclohexyl methane, 2,4- and/or 4,4'-diisocyanato-diphenyl methane and mixtures of these isomers with their higher homologues which are obtained by the phosgenation of aniline/formaldehyde condensates, 2,4- and/or 2,6-diisocyanatotoluene and any mixtures of these compounds.

9. The coating composition of claim 1, wherein said prepolymer is a reaction product of an isocyanate or polyisocyanate with a polyol of molecular weight 62 to 20,000.

10. The coating composition of claim 1, wherein said prepolymer is a reaction product of the isocyanate or polyisocyanate with an active hydrogen containing component selected from the group consisting of polyester polyols, polycaprolactone polyols, polyether polyols, polyhydroxy polycarbonates, polyhydroxy polyacetals, polyhydroxy polyacrylates, polyhydroxy polyester amides, polyhydroxy polythioethers and mixtures thereof.

11. The coating composition of claim 1, wherein said prepolymer is a reaction product of the isocyanate or polyisocyanate with 1,3-propanediol, 1,4-butanediol and/or 1,6-hexanediol, diethylene glycol, triethylene glycol or tetraethylene glycol with diarylcarbonates or cyclic carbonates.

12. The coating composition of claim 1, wherein the prepolymer forms an elastomer having hardness in the range of 40A-75D when it is reacted with a curative agent selected from the group consisting of 4,4'-methylenebis (orthochloroaniline) and polyol curatives.

13. The coating composition of claim 1, wherein the prepolymer contains low free isocyanate monomers.

14. The coating composition of claim 1, wherein the prepolymer is selected from the group consisting of aromatic prepolymers, aliphatic prepolymers, isocyanate-terminated PTMEG prepolymer based on HMDI(18% isocyanate NCO) and BAYTEC® WP-260 (isocyanate-terminated PPG Polyether prepolymer based on HMDI, 26% NCO).

15. The coating composition of claim 1, wherein the prepolymers are present in the coating composition in an amount of about 10 weight percent to about 95 weight percent, based on the total weight of the coating composition.

16. The coating composition of claim 1, wherein the prepolymers are present in the coating composition in an amount of about 20 to about 70 weight percent, based on the total weight of the coating composition.

17. The coating composition of claim 1, wherein the curing agent is polyaspartic ester having the general formula (II):

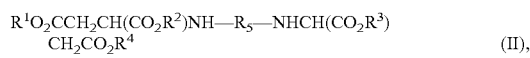

(II), wherein $R^1$, $R^2$, $R^3$, and $R^4$ are the same or different and each are alkyl groups having an amount of about 1 to about 12 carbon atoms. In one embodiment, the alkyl groups have an amount of 1 to about 4 carbon atoms. An exemplary alkyl group is an ethyl group. $R_5$ can be aliphatic, alicyclic, or aromatic.

18. The coating composition of claim 1, wherein the curing agent is polyaspartic ester as shown in formula (III):

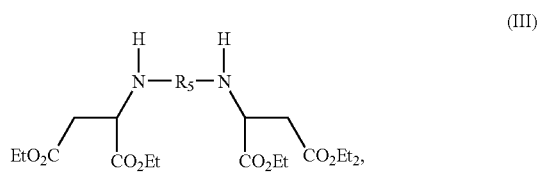

(III)

wherein $R_5$ can have the structures shown in formulas (IV)-(VII) below:

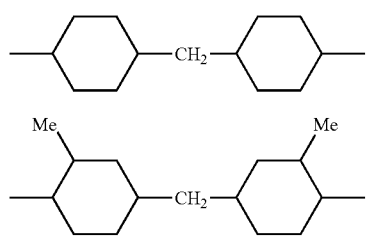

(IV)

(V)

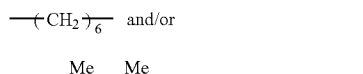 and/or (VI)

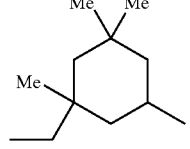

(VII)

wherein Me represents a methyl group.

19. The coating composition of claim 1, wherein the amine is an aromatic amine selected from the group consisting of phenylene diamine, 4,4'methylene-bis-(2-chloroaniline), 4,4'methylenedianiline (MDA), 4,4'methylenebis(2,6-diethylaniline), 4,4'methylenebis(2,6-dimethylaniline), 4,4'methylenebis(2-isopropyl-6-methylaniline), 4,4'methylenebis(2-ethyl-6-methylaniline), 4,4'methylenebis(2,6-isopropylaniline), 4,4'methylenebis(3-chloro-2,6-diethylaniline) (MCDEA), 1,3-propanediolbis(4-aminobenzoate), diethyltoluenediamine (DETDA), dimethylthiotoluenediamine; and mixtures thereof.

20. The coating composition of claim 1, wherein the curing agent is selected from the group consisting of aromatic amines, cyclic and aromatic polyols and long chain polyols.

21. The coating composition of claim 1, wherein the curing agent contains polyaspartic esters and an optional co-curing agent selected from the group consisting of aldimines, ketimines, aromatic diamines and diols.

22. The coating composition of claim 1, wherein the curing agent contains aldimines prepared from polyamines having cyclic groups.

23. The coating composition of claim 1, wherein the curing agent contains aldimines having structures corresponding to the formula (VIII):

(VIII), wherein $X_1$ represents an organic group that has a valency of n and is obtained by removing the amino groups from a cyclic organic polyamine having (cyclo)aliphatically-bound amino groups, preferably a diamine and more preferably a hydrocarbon group obtained by removing the amino groups from a diamine having at least one cycloaliphatically-bound amino group, $R_6$ and $R_7$ may be the same or different and represent organic groups which are inert towards isocyanate groups at a temperature of 100° C., or less, preferably containing 1 to 10, more preferably 1 to 6, carbon atoms, or $R_6$ and $R_7$ together with the β-carbon atom form a cycloaliphatic or heterocyclic ring and n represents an integer having a value of at least 2, preferably 2 to 6, more preferably 2 to 4 and most preferably 2.

24. The coating composition of claim 1, wherein the aldimine is a latent aliphatic polyamine.

25. The coating composition of claim 1, wherein the aldimine is isophoronediamine aldimines.

26. The coating composition of claim 1, wherein the curing agent selected from the group consisting of polyaspartic esters, ketimines, aldimines, or a mixture thereof.

27. The coating composition of claim 1, wherein the curing agent comprises the aldimine and polyaspartic esters.

28. The coating composition of claim 1, wherein the curing agent further comprises an additional catalyst selected from the group of organometallic compounds selected from the group consisting of organotins, dibutyltindilaurate, stannous octoate; tertiary amines, triethylenediamine, triethylamine, n-ethylmorpholine, dimethylcyclohexylamine, 1,8-diazabicyclo-5,4,0-undecene-7 and mixtures thereof.

29. The coating composition of claim 1, wherein the curing agent comprises a multifunctional imine. The multi-functional imine may be represented by the formula (TX):

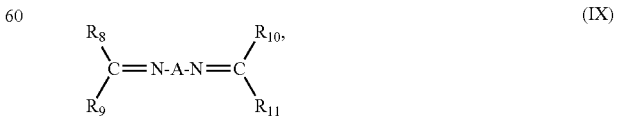

(IX)

wherein $R_8$, $R_9$, $R_{10}$, and $R_{11}$ are radicals that can be the same or different and wherein each is independently selected from the group consisting of hydrogen, an alkyl having from 1 to 10 carbon atoms and phenyl and wherein A may be any radical having a molecular weight from 26 to 7000.

30. The coating composition of claim 1, wherein the curing agent is selected from the group consisting of cyclic curing agents, aromatic diamines, cycloaliphatic diamines, di-functional curing agents, tri-functional curing agents, tetra-functional curing agents and mixtures thereof.

31. The coating composition of claim 1, wherein the flatting agent is selected from the group consisting of fine particle powders of organic and inorganic materials, urea-formaldehydes, precipitated silica, fumed silica, polymeric beads, talc, alumina, calcium carbonate, or a mixture thereof.

32. The coating composition of claim 1, wherein the flatting agent is present in sufficient concentration to produce a matte finish as measured according to ASTM D 523-89 (1999) with an 85 degree surface gloss less than 15.

33. The coating composition of claim 1, wherein the amount of flatting agent about 2 to about 10 weight percent based on the total weight of the coating composition.

34. The coating composition of claim 1 wherein the substrate of a leading edge on an airfoil is selected from the group consisting of an aircraft wing, a rotor blade, a propeller blade, a nose cone, a radome, a fan blade and an antenna.

35. A polyurethane coating composition for protecting a leading edge substrate on an airfoil against liquid and solid particle erosion comprising:
  a water based polyurethane dispersion with a flatting agent dispersed therein, said flatting agent having a particle size of about 1 to about 20 micrometers present at a level of about 1 to about 15 weight percent based on the total weight of the said polyurethane coating composition, and selected from the group consisting of silica, polymeric beads, talc, alumina, calcium carbonate, urea-formaldehydes and mixtures thereof, said water based polyurethane dispersion in dry form having a tensile strength greater than 1000 psi (70 kg/cm$^2$), an elongation at break greater than 350%, a tensile set after break of less than 150%, and a Shore A hardness of 44A to 95A as measured at 68° F., having a matte finish as measured according to ASTM D 523-89 (1999) with an 85 degree surface gloss less than 15, and having a rain erosion resistance of greater than or equal to 70 minutes.

36. The polyurethane coating composition of claim 35 wherein said water based polyurethane dispersion is a pre-reacted polyurethane polymer having crosslinking functional groups selected from the group consisting of free carboxyl and hydroxyl reactive functional groups available for further crosslinking.

37. The polyurethane coating composition of claim 36 wherein said polyurethane dispersion is further crosslinked using materials containing functional groups consisting of the group consisting of isocyanate, epoxy, and aziridine containing materials.

38. The coating composition of claim 35 wherein the substrate of a leading edge on an airfoil is selected from the group consisting of an aircraft wing, a rotor blade, a propeller blade, a nose cone, a radome, a fan blade and an antenna.

* * * * *

UNITED STATES PATENT AND TRADEMARK OFFICE
CERTIFICATE OF CORRECTION

PATENT NO. : 8,557,388 B2
APPLICATION NO. : 12/815963
DATED : October 15, 2013
INVENTOR(S) : Shek C. Hong Page 1 of 1

It is certified that error appears in the above-identified patent and that said Letters Patent is hereby corrected as shown below:

In the Claims

In Claim 29
Column 2, line 57: After "formula", please delete "(TX)" and substitute --(IX)--.

Signed and Sealed this
Sixth Day of May, 2014

Michelle K. Lee
*Deputy Director of the United States Patent and Trademark Office*

UNITED STATES PATENT AND TRADEMARK OFFICE
CERTIFICATE OF CORRECTION

PATENT NO. : 8,557,388 B2  
APPLICATION NO. : 12/815963  
DATED : October 15, 2013  
INVENTOR(S) : Shek C. Hong Page 1 of 1

It is certified that error appears in the above-identified patent and that said Letters Patent is hereby corrected as shown below:

In the Claims

In Claim 29  
Column 34, line 57: After "formula", please delete "(TX)" and substitute --(IX)--.

This certificate supersedes the Certificate of Correction issued May 6, 2014.

Signed and Sealed this  
Third Day of June, 2014

Michelle K. Lee  
*Deputy Director of the United States Patent and Trademark Office*